(12) United States Patent
Kim et al.

(10) Patent No.: US 12,547,271 B2
(45) Date of Patent: Feb. 10, 2026

(54) ELECTRONIC DEVICE

(71) Applicant: HiDeep Inc., Seongnam-si (KR)

(72) Inventors: Seyeob Kim, Seongnam-si (KR);
Bonkee Kim, Seongnam-si (KR);
Young ho Cho, Seongnam-si (KR);
Giduk Kim, Seongnam-si (KR);
Myeonggyu Song, Seongnam-si (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 18/613,033

(22) Filed: Mar. 21, 2024

(65) Prior Publication Data
US 2024/0319819 A1 Sep. 26, 2024

(30) Foreign Application Priority Data

Mar. 23, 2023 (KR) .................. 10-2023-0037850
Jun. 23, 2023 (KR) .................. 10-2023-0080962

(51) Int. Cl.
*G06F 3/041* (2006.01)
*G06F 3/0354* (2013.01)
*G06F 3/038* (2013.01)

(52) U.S. Cl.
CPC ...... *G06F 3/04166* (2019.05); *G06F 3/03545* (2013.01); *G06F 3/038* (2013.01); *G06F 3/04162* (2019.05)

(58) Field of Classification Search
CPC ............ G06F 3/03545; G06F 3/04162; G06F 3/04166; G06F 3/041662; G06F 3/0448; G06F 3/046
See application file for complete search history.

(56) References Cited

U.S. PATENT DOCUMENTS

| | | | |
|---|---|---|---|
| 2014/0253499 A1* | 9/2014 | Lee | G06F 3/0448 345/174 |
| 2015/0049044 A1 | 2/2015 | Yousefpor et al. | |
| 2015/0268783 A1 | 9/2015 | Yoon et al. | |
| 2021/0342053 A1* | 11/2021 | Cho | G06F 3/04164 |
| 2022/0147212 A1* | 5/2022 | Kim | G06F 3/04162 |
| 2024/0248571 A1* | 7/2024 | Kim | G06F 3/04164 |

FOREIGN PATENT DOCUMENTS

| | | |
|---|---|---|
| KR | 1020160025443 A | 3/2016 |
| KR | 1020220062191 A | 5/2022 |
| KR | 1020220134139 A | 10/2022 |
| KR | 1020220145666 A | 10/2022 |
| WO | 2022203471 A1 | 9/2022 |

* cited by examiner

*Primary Examiner* — Priyank J Shah
(74) *Attorney, Agent, or Firm* — The Belles Group, P.C.

(57) ABSTRACT

Disclosed is an electronic device comprising: a sensor unit; and a control unit, wherein the sensor unit comprises a plurality of first patterns extending in a first direction; a plurality of second patterns extending in the first direction, wherein the plurality of second patterns are disposed adjacent to the plurality of first patterns and have one ends that are electrically connected to each other; a plurality of third patterns extending in a second direction perpendicular to the first direction; and a plurality of fourth patterns extending in the second direction, wherein the plurality of fourth patterns are disposed adjacent to the plurality of third patterns and have one ends that are electrically connected to each other.

13 Claims, 18 Drawing Sheets

Single-end sensing dat                    TX Coupling

| | RX0 | RX1 | RX2 | RX3 | RX4 | RX5 | RX6 | RX7 | RX8 | RX9 | RX10 | RX11 | RX12 | RX13 | RX14 | RX15 | RX16 | RX17 | RX18 | RX19 | RX20 |
|---|---|---|---|---|---|---|---|---|---|---|---|---|---|---|---|---|---|---|---|---|---|
| TX0 | 43 | 39 | 36 | 51 | 37 | 57 | 52 | 60 | 71 | 66 | 52 | 34 | 33 | 33 | 37 | 37 | 40 | 32 | 28 | 31 | 28 |
| TX1 | 31 | 31 | 25 | 33 | 29 | 47 | 52 | 52 | 50 | 58 | 38 | 34 | 38 | 25 | 26 | 31 | 28 | 32 | 30 | 32 | 24 |
| TX2 | 51 | 51 | 53 | 66 | 49 | 69 | 69 | 77 | 77 | 75 | 58 | 58 | 64 | 49 | 50 | 52 | 57 | 57 | 53 | 60 | 44 |
| TX3 | 45 | 37 | 32 | 41 | 37 | 59 | 51 | 66 | 63 | 62 | 57 | 44 | 54 | 35 | 47 | 44 | 42 | 44 | 40 | 44 | 30 |
| TX4 | 53 | 51 | 47 | 58 | 45 | 65 | 60 | 80 | 70 | 66 | 54 | 54 | 49 | 37 | 47 | 40 | 41 | 44 | 39 | 48 | 43 |
| TX5 | 12 | 13 | 12 | 15 | 15 | 26 | 25 | 34 | 38 | 35 | 34 | 23 | 19 | 9 | 12 | 14 | 12 | 13 | 13 | 16 | 5 |
| TX6 | 30 | 26 | 24 | 31 | 28 | 37 | 41 | 56 | 56 | 48 | 41 | 30 | 26 | 22 | 23 | 26 | 16 | 23 | 34 | 30 | 10 |
| TX7 | 15 | 22 | 14 | 33 | 24 | 28 | 46 | 47 | 52 | 50 | 46 | 33 | 29 | 26 | 23 | 28 | 18 | 33 | 25 | 27 | 16 |
| TX8 | 13 | 7 | 12 | 8 | 5 | 16 | 34 | 39 | 44 | 49 | 30 | 23 | 12 | 10 | 16 | 14 | 13 | 19 | 17 | 15 | 7 |
| TX9 | 16 | 22 | 18 | 8 | 13 | 33 | 42 | 54 | 49 | 58 | 48 | 21 | 16 | 20 | 15 | 10 | 23 | 26 | 16 | 19 | 13 |
| TX10 | 23 | 16 | 19 | 15 | 27 | 61 | 191 | 272 | 255 | 192 | 59 | 29 | 19 | 18 | 19 | 17 | 27 | 24 | 24 | 20 | 2 |
| TX11 | 30 | 42 | 39 | 24 | 48 | 240 | 341 | 351 | 341 | 358 | 223 | 48 | 38 | 43 | 37 | 35 | 33 | 46 | 42 | 42 | 6 |
| TX12 | 32 | 44 | 36 | 35 | 124 | 323 | 345 | 343 | 340 | 362 | 349 | 90 | 37 | 49 | 42 | 36 | 34 | 47 | 44 | 50 | 6 |
| TX13 | 52 | 56 | 56 | 49 | 177 | 353 | 374 | 357 | 354 | 375 | 379 | 134 | 56 | 62 | 64 | 59 | 54 | 60 | 63 | 62 | 26 |
| TX14 | 47 | 49 | 49 | 38 | 121 | 337 | 362 | 359 | 349 | 377 | 350 | 80 | 52 | 50 | 47 | 49 | 46 | 55 | 53 | 51 | 17 |
| TX15 | 33 | 34 | 36 | 24 | 48 | 204 | 349 | 357 | 342 | 354 | 184 | 41 | 24 | 29 | 30 | 28 | 33 | 33 | 35 | 32 | 6 |
| TX16 | 5 | 11 | 13 | 7 | 10 | 29 | 149 | 238 | 211 | 127 | 27 | 10 | 12 | 8 | 18 | 15 | 8 | 16 | 7 | 5 | 3 |
| TX17 | 11 | 19 | 22 | 23 | 32 | 55 | 68 | 74 | 69 | 70 | 51 | 19 | 27 | 28 | 23 | 23 | 24 | 23 | 30 | 22 | 18 |

(a) Single reception                       RX Coupling

Calculated differential data

| | RX0 | RX1 | RX2 | RX3 | RX4 | RX5 | RX6 | RX7 | RX8 | RX9 | RX10 | RX11 | RX12 | RX13 | RX14 | RX15 | RX16 | RX17 | RX18 | RX19 | RX20 |
|---|---|---|---|---|---|---|---|---|---|---|---|---|---|---|---|---|---|---|---|---|---|
| TX0 | 4 | 3 | 15 | 14 | 20 | 5 | 8 | 11 | 5 | 14 | 18 | 1 | 0 | 4 | 0 | 3 | 8 | 4 | 3 | 3 | 0 |
| TX1 | 0 | 6 | 8 | 4 | 18 | 5 | 0 | 2 | 8 | 20 | 4 | 4 | 13 | 1 | 5 | 3 | 4 | 2 | 2 | 8 | 3 |
| TX2 | 0 | 2 | 13 | 17 | 20 | 0 | 8 | 0 | 2 | 17 | 0 | 6 | 15 | 1 | 2 | 5 | 0 | 4 | 7 | 16 | 5 |
| TX3 | 8 | 5 | 9 | 4 | 22 | 8 | 15 | 3 | 1 | 5 | 13 | 10 | 19 | 12 | 3 | 2 | 2 | 4 | 4 | 14 | 4 |
| TX4 | 2 | 4 | 11 | 13 | 20 | 5 | 20 | 10 | 4 | 12 | 0 | 5 | 12 | 10 | 7 | 1 | 3 | 5 | 9 | 5 | 6 |
| TX5 | 1 | 1 | 3 | 1 | 10 | 1 | 9 | 4 | 3 | 1 | 11 | 4 | 10 | 3 | 2 | 2 | 1 | 0 | 6 | 14 | 1 |
| TX6 | 4 | 2 | 7 | 3 | 9 | 4 | 15 | 0 | 8 | 7 | 11 | 4 | 4 | 1 | 3 | 10 | 7 | 11 | 4 | 11 | 6 |
| TX7 | 7 | 8 | 19 | 9 | 4 | 18 | 1 | 5 | 2 | 4 | 13 | 4 | 3 | 3 | 5 | 10 | 15 | 8 | 2 | 11 | 1 |
| TX8 | 6 | 5 | 4 | 3 | 13 | 16 | 5 | 5 | 5 | 19 | 7 | 11 | 2 | 5 | 1 | 1 | 6 | 2 | 1 | 9 | 7 |
| TX9 | 6 | 4 | 10 | 5 | 20 | 9 | 12 | 5 | 9 | 10 | 27 | 5 | 4 | 5 | 5 | 13 | 3 | 10 | 3 | 6 | 1 |
| TX10 | 7 | 3 | 4 | 12 | 24 | 140 | 81 | 17 | 73 | 123 | 30 | 10 | 1 | 1 | 2 | 10 | 3 | 0 | 4 | 18 | 2 |
| TX11 | 12 | 3 | 15 | 24 | 192 | 101 | 10 | 10 | 17 | 135 | 175 | 10 | 5 | 6 | 2 | 2 | 13 | 4 | 0 | 36 | 2 |
| TX12 | 12 | 8 | 1 | 89 | 199 | 22 | 2 | 3 | 22 | 13 | 259 | 53 | 12 | 7 | 6 | 2 | 13 | 3 | 6 | 44 | 9 |
| TX13 | 4 | 0 | 7 | 128 | 176 | 21 | 7 | 13 | 22 | 3 | 245 | 76 | 6 | 2 | 5 | 5 | 6 | 3 | 1 | 36 | 11 |
| TX14 | 2 | 0 | 11 | 83 | 215 | 25 | 7 | 20 | 28 | 27 | 270 | 28 | 2 | 3 | 2 | 3 | 9 | 2 | 2 | 34 | 16 |
| TX15 | 1 | 2 | 12 | 24 | 153 | 148 | 8 | 15 | 22 | 180 | 143 | 17 | 5 | 1 | 2 | 5 | 0 | 2 | 3 | 27 | 9 |
| TX16 | 6 | 2 | 12 | 9 | 19 | 114 | 95 | 27 | 84 | 100 | 17 | 2 | 4 | 10 | 3 | 7 | 8 | 9 | 2 | 8 | 13 |
| TX17 | 8 | 3 | 1 | 9 | 23 | 13 | 6 | 5 | 1 | 19 | 32 | 8 | 1 | 5 | 0 | 1 | 1 | 7 | 8 | 4 | 11 |

(b) Differential reception

FIG. 9

| Touch | Mode | TX | RX | STX | SRX |
|---|---|---|---|---|---|
| Finger | Mutual sensing | Driving | Receiving | | |
| | | Driving | Receiving | Driving | Receiving |
| | | Driving | Receiving | Driving | GND |
| | | Driving | Receiving | Driving | Floating |
| | | Driving | Receiving | GND | Receiving |
| | | Driving | Receiving | GND | GND |
| | | Driving | Receiving | GND | Floating |
| | | Driving | Receiving | Floating | Receiving |
| | | Driving | Receiving | Floating | GND |
| | | Driving | Receiving | Floating | Floating |
| | Self sensing | Driving/Receiving | Driving/Receiving | | |
| | | Driving/Receiving | Driving/Receiving | Driving | Driving |
| | | Driving/Receiving | Driving/Receiving | Driving | GND |
| | | Driving/Receiving | Driving/Receiving | Driving | Floating |
| | | Driving/Receiving | Driving/Receiving | GND | Driving |
| | | Driving/Receiving | Driving/Receiving | GND | GND |
| | | Driving/Receiving | Driving/Receiving | GND | Floating |
| | | Driving/Receiving | Driving/Receiving | Floating | Driving |
| | | Driving/Receiving | Driving/Receiving | Floating | GND |
| | | Driving/Receiving | Driving/Receiving | Floating | Floating |

FIG. 11

| Touch | Mode | TX | RX | STX | SRX |
|---|---|---|---|---|---|
| Stylus | Uplink | | | Driving | |
| | | Floating | Floating | Driving | Floating |
| | | Driving | Floating | Driving | Floating |
| | | Floating | GND | Driving | Floating |
| | | Driving | GND | Driving | Floating |
| | | Floating | Floating | Driving | GND |
| | | Driving | Floating | Driving | GND |
| | | Floating | GND | Driving | GND |
| | | Driving | GND | Driving | GND |
| | Downlink | Receiving | Receiving | | |
| | | Receiving | Receiving | GND | GND |
| | | Receiving | Receiving | GND | Floating |
| | | Receiving | Receiving | GND | Receiving |
| | | Receiving | Receiving | Receiving | GND |
| | | Receiving | Receiving | Receiving | Floating |
| | | Receiving | Receiving | Receiving | Receiving |
| | | Receiving | Receiving | Floating | GND |
| | | Receiving | Receiving | Floating | Floating |
| | | Receiving | Receiving | Floating | Receiving |
| | | | | Receiving | Receiving |
| | | GND | GND | Receiving | Receiving |
| | | GND | Floating | Receiving | Receiving |
| | | GND | Receiving | Receiving | Receiving |
| | | Receiving | GND | Receiving | Receiving |
| | | Receiving | Floating | Receiving | Receiving |
| | | Receiving | Receiving | Receiving | Receiving |
| | | Floating | GND | Receiving | Receiving |
| | | Floating | Floating | Receiving | Receiving |
| | | Floating | Receiving | Receiving | Receiving |

FIG. 12

ELECTRONIC DEVICE

CROSS-REFERENCE TO RELATED APPLICATIONS

This U.S. non-provisional patent application claims priority under 35 USC § 119 of Korean Patent Application No. 10-2023-0037850, filed on Mar. 23, 2023, and Korean Patent Application No. 10-2023-0080962, filed on Jun. 23, 2023, the entire contents of all of which are hereby incorporated herein by reference, for all purposes.

TECHNICAL FIELD

The present invention relates to an electronic device. In particular, the present invention relates to an electronic device capable of preventing an abnormal touch signal from occurring in an area that is not actually touched during a finger touch operation and preventing coupling capacitance and mutual capacitance from occurring when a pen driving electrode and a pen receiving electrode are grounded.

BACKGROUND ART

Recently, smartphones and tablet PCs have been actively spread and a technology of built-in contact position measurement device has been also actively developed.

The smartphones or tablet PCs generally have a touch screen. Thus, a user may specify a specific coordinate on the touch screen using a finger or a stylus pen. In other words, the user may input a specific signal to the smartphone by specifying the specific coordinate of the touch screen.

The touch screen may operate based on electrical, infrared, and ultrasonic methods. A R-type touch screen (resistive touch screen) or a C-type touch screen (capacitive touch screen) may be an example of the electrical operation method.

Conventionally, the R-type touch screen, which may simultaneously recognize a user's finger and a stylus pen, is widely used among the touch screens. However, the R-type touch screen has a problem due to reflection caused by an air layer between ITO layers.

Accordingly, recently, the C-type touch screen has been used widely.

Here, the C-type touch screen is a touch screen which operates by detecting a difference in capacitance of a transparent electrode caused by contacting an object.

However, the C-type touch screen has a disadvantage of causing an operation error due to unintentional hand contact while using a pen because of the difficulty of physical distinguishment between the hand and the pen.

Conventionally, to improve the problem, the hand and the pen are distinguished by using a method of processing only with software which may distinguish a hand and a pen based on a contact area and a method of including a separated position measurement device using an EMR (electromagnetic resonance) method except for the C-type touch screen.

In other words, the EMR method is used when using a touch function of the stylus pen during a hand touching and display operation. The EMR method has an advantage of being insensitive to a display and external noises by using a magnetic field instead of an electric field as a driving force.

However, the EMR method generates a magnetic field and transmits the magnetic field to the stylus pen. In order to receive the magnetic field generated by the stylus pen again, a sensor film made of an additional FPCB is attached to a back surface of the display.

This component is a digitizer. The digitizer detects a change in the magnetic field generated by interaction when a position of the stylus pen moves.

FIG. 1 is a schematic diagram for explaining a state in which an output voltage Vout of a capacitance to voltage amplifier (CVA) is varied based on the position of the stylus pen 10 on a flexible display panel of a conventional electronic device.

Referring to FIG. 1, the output of the CVA is varied based on the position of the stylus pen 10 on the flexible display panel because an impedance ratio of both sides based on the stylus pen 10 on a sensing line is varied.

Based on a major axis of the conventional flexible display panel, a resistance (R) of a metal mesh touch sensor is approximately 1.2 k ohm, and a capacitor (C) is approximately 250 pF.

Based on 10 distributed models, at a driving frequency of 300 kHz, an impedance of the capacitor is approximately 200 times greater than the resistance (120 ohm vs. $1/(2\pi*300 \text{ k}*25 \text{ pF})=21$ k ohm). Therefore, the capacitor may be a major factor.

FIG. 2 is a diagram for explaining, through a current sensing, that output voltages Vout1 and Vout2 of the CVA are different based on the position of the pen 10 in FIG. 1.

FIG. 3 is a diagram for explaining, through a voltage sensing, that the output voltages Vout1 and Vout2 of the CVA are different based on the position of the stylus pen 10 in FIG. 1.

Referring to FIGS. 2 and 3, the output voltage of the CVA is varied based on the position of the stylus pen 10 on the sensing line. In other words, as a distance from the stylus pen 10 to a sensing circuit unit 50 decreases, the output voltage of the CVA increases, and as the distance from the stylus pen 10 to the sensing circuit unit 50 increases, the output voltage of the CVA decreases.

However, due to the capacitance coupling phenomenon, a touch-driven coupling and/or a touch-receiving coupling may occur between a touch driving electrode and a touch receiving electrode adjacent thereto. Therefore, an abnormally weak touch signal may occur between the touch driving electrode and the adjacent touch receiving electrode in an area that is not substantially touched.

In addition, it is a problem that an amount of coupling appears differently, and an abnormal step occurs because a pen receiving electrode is divided into upper and lower portions, and the pen receiving electrode is electrically connected.

In addition, in case of the self-sensing mode, when the pen driving electrode and the pen receiving electrode are grounded, it is a problem that capacitance of the touch driving electrode and the touch receiving electrode increases significantly due to coupling capacitance and mutual capacitance between the electrodes.

SUMMARY

The present invention provides an electronic device capable of preventing an abnormally weak touch signal from occurring in an area which is not actually touched during a finger mutual touch operation and preventing capacitance of a touch driving electrode and a touch receiving electrode from significantly increasing.

An electronic device according to an embodiment of the present invention includes: a sensor unit; and a control unit. The sensor unit includes: a plurality of first patterns extending in a first direction; a plurality of second patterns extending in the first direction, wherein the plurality of second patterns are disposed adjacent to the plurality of first patterns and have one ends that are electrically connected to each other; a plurality of third patterns extending in a second direction perpendicular to the first direction; and a plurality of fourth patterns extending in the second direction, wherein the plurality of fourth patterns are disposed adjacent to the plurality of third patterns and have one ends that are electrically connected to each other.

Here, the control unit may control the sensing unit to operate in a mutual-sensing mode in which the sensing unit receives a touch driving signal from a first touch electrode and outputs a touch detection signal to a second touch electrode, and the control unit may: apply the touch driving signal to the plurality of first patterns, receive the touch detection signal through the plurality of third patterns, and apply one of a pen driving signal, a pen detection signal, grounding and floating to the plurality of second patterns and the plurality of fourth patterns.

Here, the control unit may control the sensing unit to operate in a self-sensing mode in which the sensing unit receives a touch driving signal from one electrode and outputs a touch detection signal, and the control unit may: apply the touch driving signal through the plurality of first patterns and the plurality of third patterns; and receive the touch detection signal.

Here, the control unit may apply one of a touch driving signal, grounding, and floating to the plurality of second patterns and the plurality of fourth patterns.

Here, the control unit may control a stylus pen to operate in an uplink mode, and the control unit may: apply a pen driving signal for driving the stylus pen to the plurality of second patterns in order to control the stylus pen; and apply one of a touch driving signal, grounding, and floating to the plurality of first patterns, the plurality of third patterns, and the plurality of fourth patterns.

Here, the control unit may control a stylus pen to operate in a downlink mode for sensing a touch position of the stylus pen, and when the control unit receives a pen detection signal from the stylus pen through the plurality of first patterns and the plurality of third patterns, the control unit may apply one of a touch detection signal reception, grounding, and floating to the plurality of first patterns and the plurality of third patterns.

Here, when the control unit receives a pen detection signal from the plurality of second patterns and the plurality of fourth patterns, the control unit may apply one of a touch reception signal, grounding, and floating to the plurality of first patterns and the plurality of second patterns.

Here, the plurality of first to fourth patterns may be spaced apart from each other on the same layer.

Here, in case of the self-sensing mode, when the plurality of first patterns and the plurality of third patterns are operated, the plurality of second patterns and the plurality of fourth patterns may be simultaneously operated together.

Here, the plurality of first patterns may be operated as the touch driving electrode to which the touch driving signal is applied, the plurality of second patterns may be operated as a pen driving electrode to which a pen driving signal is applied, the plurality of third patterns may be operated as the touch receiving electrode to which the touch detection signal is applied, and the plurality of first patterns to the plurality of fourth patterns may be operated as a pen receiving electrode to which a pen detection signal is applied.

Here, wherein the control unit may set a connection with the plurality of first patterns to the plurality of fourth patterns in one of following cases, the cases, including: (a) a case of being connected with the first plurality of patterns, the plurality of second patterns, and the plurality of third patterns; (b) a case of being connected with all of the plurality of first patterns to the plurality of fourth patterns; (c) a case of being connected with the plurality of first patterns, the plurality of third patterns, and the plurality of fourth patterns; (d) a case of being connected with the plurality of first patterns and the plurality of third patterns; (e) a case of being connected with the plurality of first patterns, the plurality of second patterns, and the plurality of fourth patterns; (f) a case of being connected with the plurality of second patterns, the plurality of third patterns, and the plurality of fourth patterns; and (g) a case of being connected with the plurality of second patterns and the plurality of fourth patterns.

According to the present invention, in the electronic device, when the touch signal is detected during the finger mutual touch operation, the abnormally weak touch signals and the occurrence of the touch signal in the area which is not actually touched may be prevented in advance.

In addition, in the mutual sensing mode in which the driving signal is applied to the driving electrode and the detection signal is output from the receiving electrode, by grounding the multiple pens driving electrodes and the multiple pen receiving electrodes, the abnormal transmission of the touch signals to other pen driving electrodes and/or pen receiving electrodes may be minimized.

In addition, in the self-sensing mode in which the applying of the driving signal and the outputting of the detection signal are performed simultaneously from one electrode, when the pen driving electrode and pen receiving electrode are grounded, the parasitic capacitance of the touch driving electrode and the touch receiving electrode may be prevented from increasing significantly.

BRIEF DESCRIPTION OF THE DRAWINGS

FIG. 9 is a table showing, during the finger mutual touch operation, an amount of a change in capacitance of the detected touch signal when the touch signal is received as a single reception (see (a)) and when the touch signal is received as a differential reception (see (b)) in the touch input sensor pattern shown in FIG. 6.

FIG. 11 is a table showing a control status of each electrode in the electronic device when a finger touch occurs to prevent occurrence of abnormal touch signals according to an embodiment of the present invention.

FIG. 12 is a table showing a control status of each electrode to be set within the electronic device to prevent the occurrence of an abnormal touch signal when the stylus pen touches according to an embodiment of the present invention.

DETAILED DESCRIPTION

Figure 1:
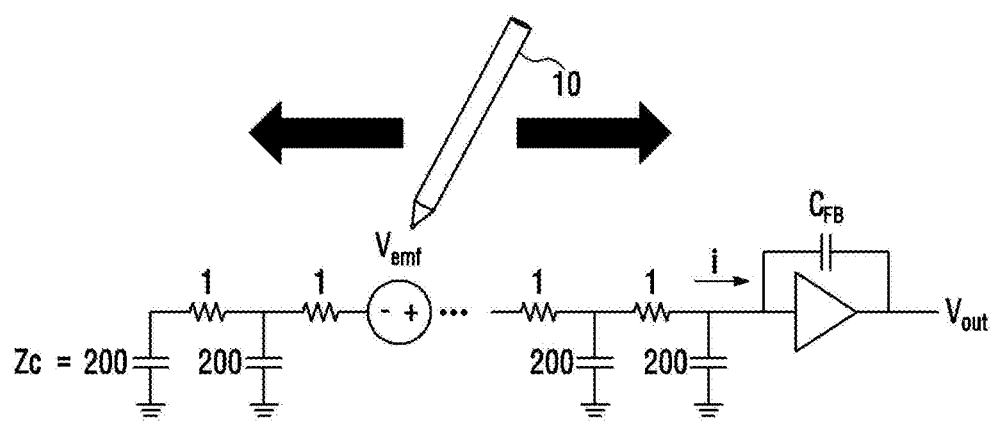
FIG. 1 is a schematic diagram for explaining a state in which a flexible display panel having a conventional electronic device. An output voltage Vout of a capacitor voltage amplitude (CVA) varies based on a position of a stylus pen 10 on a flexible display panel in a conventional electronic device.
Figure 2:
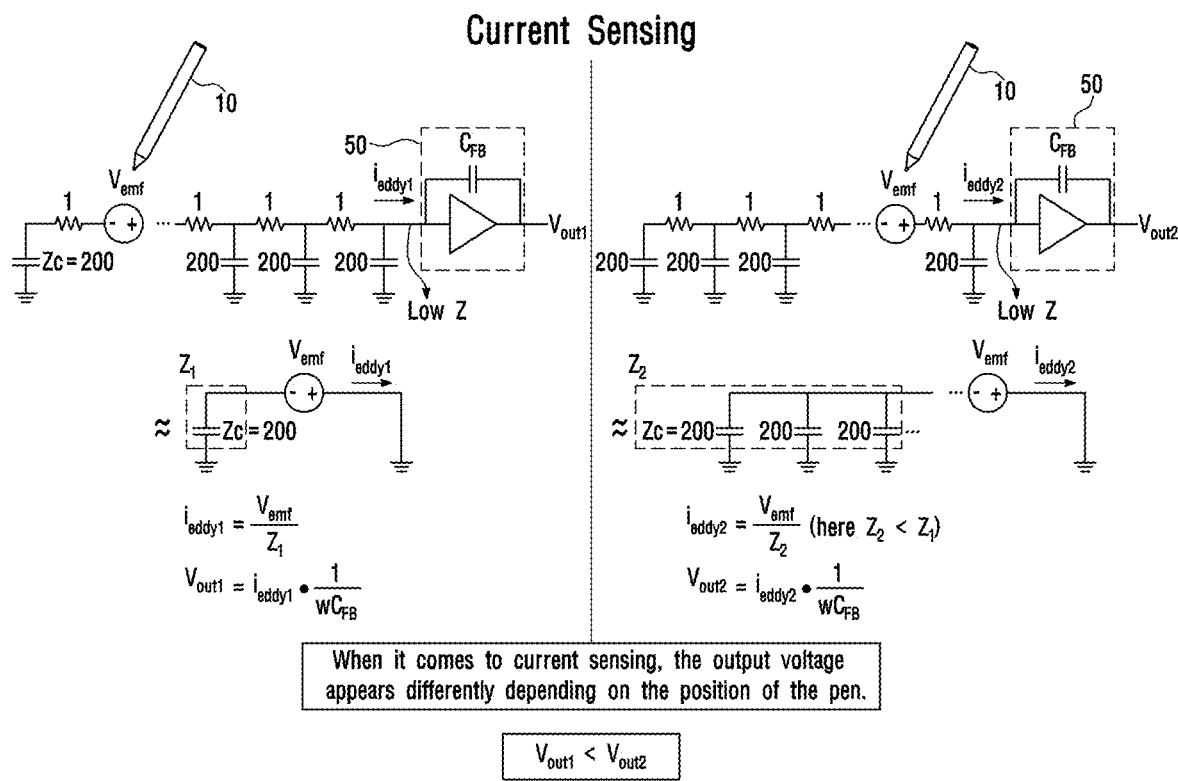
FIG. 2 is a schematic diagram for explaining that output voltages Vout1 and Vout2 of the CVA are different based on the position of the pen 10 in FIG. 1 through current sensing.
Figure 3:
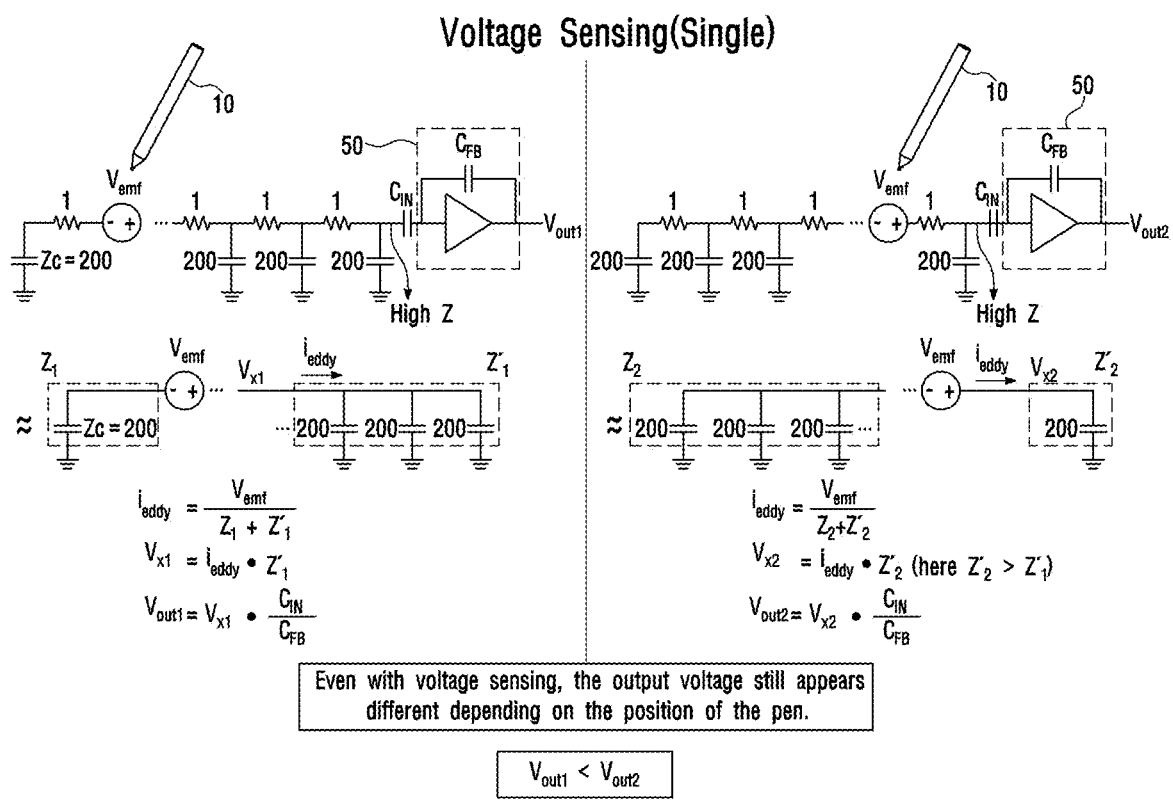
FIG. 3 is a schematic diagram for explaining that the output voltages Vout1 and Vout2 of the CVA are different based on the position of the pen 10 in FIG. 1 through voltage sensing.

The detailed description of the present invention described below refers to the accompanying drawings, which show by way of example specific embodiments in which the present invention may be practiced. These embodiments are described in sufficient detail to enable any person skilled in the art to practice the invention. It should be understood that the various embodiments of the present invention are different from one another but are not necessarily mutually exclusive. For example, specific shapes, structures, and characteristics described herein may be implemented in one embodiment or another without departing from the spirit and scope of the invention. Additionally, the location or arrangement of individual components within each disclosed embodiment may be changed without departing from the spirit and scope of the invention. Accordingly, the detailed description that follows is not intended to be taken in a limiting sense, and the scope of the invention is limited only by the appended claims, together with all equivalents to what those claims assert, if properly described. Similar reference numbers in the drawings refer to identical or similar functions across various aspects.

An electronic device according to various embodiments of this document may be a typical smartphone. The electronic device may have a rectangular screen that is relatively larger than a screen of the typical smartphone and a diagonal length of approximately 10 inches to 13 inches. For example, the electronic device may include at least one of a folding smartphone, a tablet personal computer, a vehicle display device, an e-book reader, a laptop personal computer, and a netbook computer.

In addition, the electronic device according to various embodiments of the present invention may detect a position of an object such as fingers disposed on the screen, output a driving signal to drive the stylus pen, and detect a position of the stylus pen disposed on the screen by detecting a signal emitted from the stylus pen.

Hereinafter, various embodiments will be described in detail with reference to the attached drawings.

Figure 4:
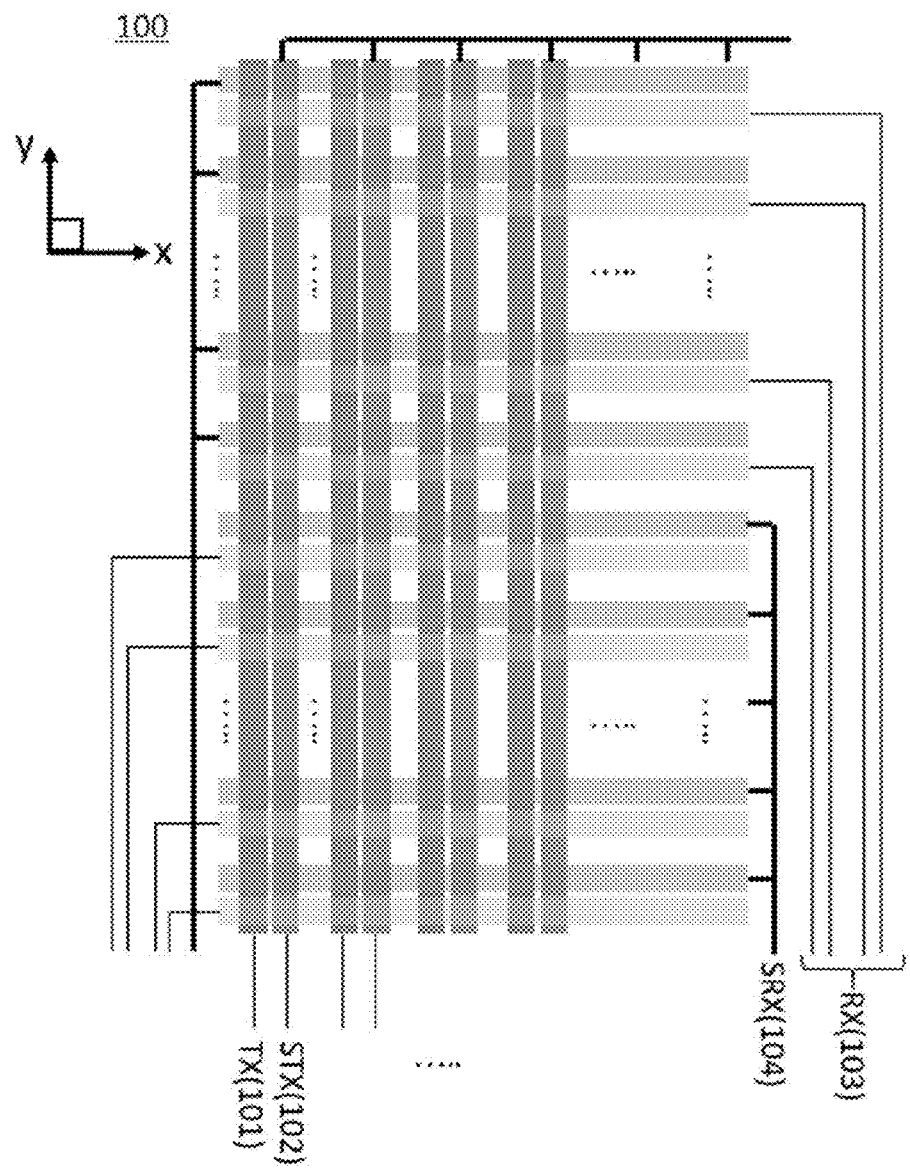
FIG. 4 is a schematic configuration diagram of a sensor unit 100 in the electronic device according to an embodiment of the present invention.

FIG. 4 is a schematic diagram of a sensor unit 100 in the electronic device according to an embodiment of the present invention.

Figure 5:
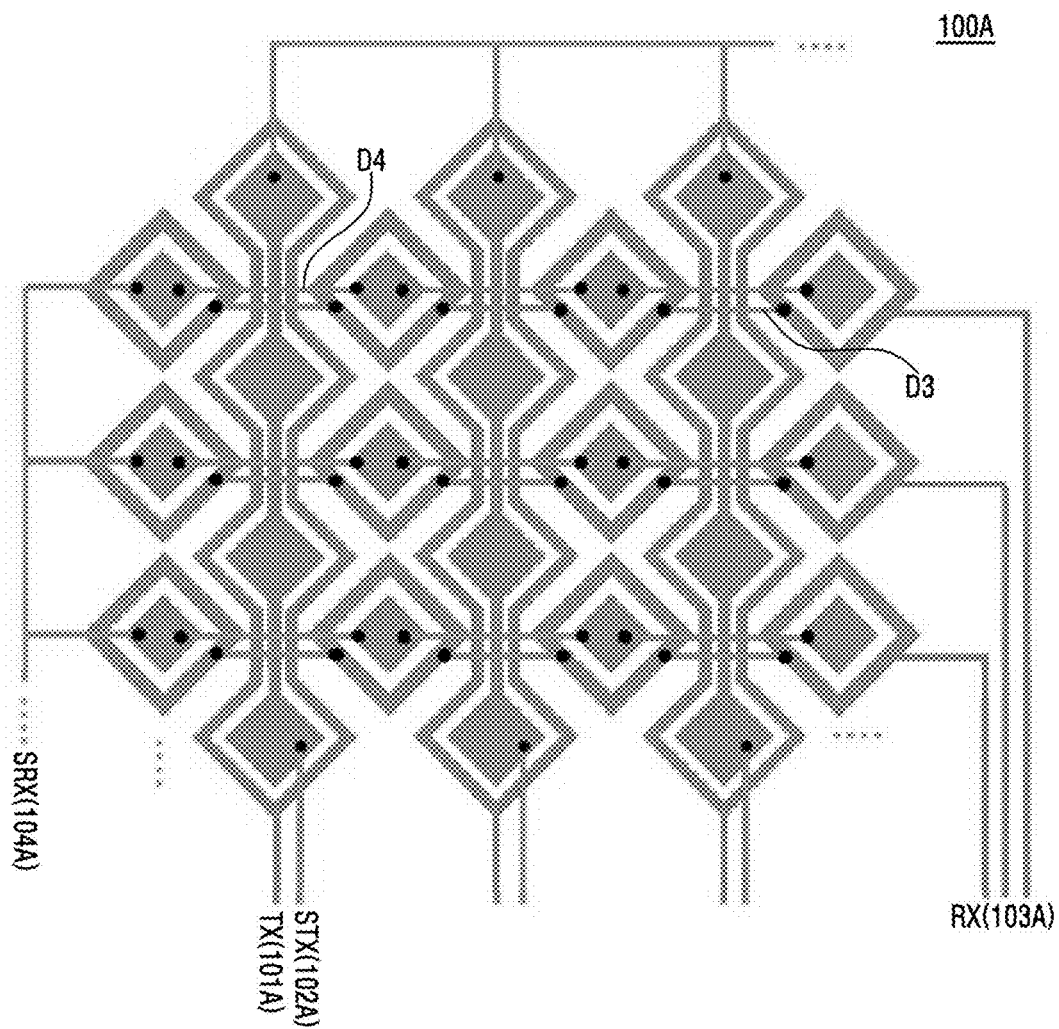
FIG. 5 is a plan view of a portion of a touch input sensor pattern of the sensor unit 100 shown in FIG. 4.

FIG. 5 is a plan view of a portion of a touch input sensor pattern of the sensor unit 100 shown in FIG. 4.

The electronic device according to an embodiment of the present invention is a portrait type electronic device. The portrait type electronic device has a width smaller than a height. A control unit (not shown) that controls the sensor unit 100 is disposed below the sensor unit 100. For example, the electronic device has a shape corresponding to that of the smartphone.

The sensor unit 100 may detect the position of an object such as a finger on the screen. Also, the sensor unit 100 may drive the stylus pen disposed on the screen. The position of the stylus pen disposed on the screen may be detected by detecting a signal emitted from the stylus pen.

The sensor unit 100 includes a plurality of patterns (or a plurality of electrodes).

The sensor unit 100 may include a plurality of first to fourth patterns 101, 102, 103, and 104.

As shown in FIG. 4, the first pattern 101 has a shape extending along an arbitrary first direction y. The first direction may be a direction of a major axis of the screen of the electronic device. The first pattern 101 may be also referred to as TX (first touch electrode or touch driving electrode).

The second pattern 102 has a shape extending along the first direction y. The second pattern 102 is disposed adjacent to the first pattern 101 and spaced a predetermined distance from the first pattern 101. The second pattern 102 may be also referred to as STX (Stylus TX, first pen electrode or pen driving electrode).

The third pattern 103 has a shape extending along a second direction x different from the first direction. The second direction x may be perpendicular to the first direction y and a direction of a minor axis of the screen of the electronic device. The third pattern 103 may be also referred to as RX (second touch electrode or touch receiving electrode).

The fourth pattern 104 has a shape extending along the second direction y. The fourth pattern 104 is disposed adjacent to the third pattern 103 and spaced a predetermined distance from the third pattern 103. The fourth pattern 104 may be also referred to as SRX (Stylus RX, second pen electrode or pen receiving electrode).

The third and fourth patterns 103 and 104 are disposed on the same layer as the first and second patterns 101 and 102 and spaced a predetermined distance from the first and second patterns 101 and 102.

The plurality of first patterns 101 are arranged along the second direction x, and the plurality of second patterns 102 are also arranged along the second direction x. The plurality of third patterns 103 are arranged along the first direction y, and the plurality of fourth patterns 104 are also arranged along the first direction y.

The first pattern 101 extends along the first direction y, and the third pattern 103 extends along the second direction x. Since the first direction y is longer than the second direction x, the number of first patterns 101 is less than that of third patterns 103. Accordingly, the number of channels of the first plurality of patterns 101 is less than that of channels of the plurality of third patterns 103.

Here, the number of the plurality of first patterns 101, and the number of the plurality of third patterns 103 may increase or decrease based on a size of the screen of the electronic device.

The number of the plurality of second patterns 102 may be the same as the number of the plurality of first patterns 101. The other ends of the plurality of second patterns 102 are electrically connected through a conductive pattern. Here, the conductive pattern may be a metal mesh or silver trace.

As shown in FIG. 5, among the plurality of second patterns 102, one ends of two or more second patterns 102 adjacent to each other may be electrically connected through a conductive pattern.

Referring to FIG. 4 again, since the plurality of third patterns 103 are arranged along the first direction y, the number of the plurality of third patterns 103 is greater than that of the plurality of first patterns 101. Therefore, the number of channels of the plurality of third patterns 103 is greater than that of channels of the plurality of first patterns 101.

The number of the plurality of fourth patterns 104 may be the same as that of the plurality of third patterns 103. The other ends of the plurality of fourth patterns 104 are electrically connected through a conductive pattern.

In the sensor unit 100 of the electronic device shown in FIG. 4, the plurality of first patterns 101 and the plurality of third patterns 103 basically sense a touch of an object such as a finger.

To this end, the plurality of first patterns 101 operate as touch driving electrodes to which a touch driving signal is applied, and the plurality of third patterns 103 may operate as touch receiving electrodes (or touch sensing electrodes) which receive a touch detection signal. Alternatively, the opposite may be true.

The sensor unit 100 of the electronic device shown in FIG. 4 may include various combinations of the plurality of first to fourth patterns 101, 102, 103, and 104 to drive and sense the stylus pen.

The plurality of first patterns 101 and the plurality of third patterns 103 sense the touch of the object such as the finger. Specifically, the plurality of first patterns 101 operate as the touch driving electrodes. The plurality of third patterns 103 operate as the touch receiving electrodes.

Additionally, one or two of the first to fourth patterns 101, 102, 103, and 104 may operate as a stylus driving electrode for driving the stylus pen. A current loop for driving the stylus pen may be formed by using one or two of the first to fourth patterns 101, 102, 103, and 104.

X-axis driving may be any one of a plurality of first patterns 101 and a plurality of second patterns 102, and Y-axis driving may be one of the third patterns 103 and the fourth patterns 104.

The stylus pen may be driven in one of an X-axis or a Y-axis or driven in both the X-axis and the Y-axis.

Two of the first to fourth patterns 101, 102, 103, and 104 may be operated as a pen sensing electrode which senses a stylus pen signal emitted from the stylus pen.

Since both X-axis sensing and Y-axis sensing are required to sense the stylus pen signal, two of the first to fourth patterns 101, 102, 103, and 104 are used.

The X-axis sensing may be one of the plurality of first patterns 101 and the plurality of second patterns 102, and the Y-axis sensing may be one of the plurality of third patterns 103 and the plurality of fourth patterns 104.

Referring to FIG. 5, a sensor unit 100A includes a plurality of first to fourth patterns 101A, 102A, 103A, and 104A. The plurality of first to fourth patterns 101A, 102A, 103A, and 104A are arranged together on the same layer.

The first pattern 101A has a shape extending along a first direction (longitudinal direction). The first direction may be a direction of a major axis of a screen of the electronic device. The first pattern 101A may also be referred to as TX.

The first pattern 101A may include a plurality of main pattern parts and a connection pattern part which connects two main pattern parts adjacent to each other among the plurality of main pattern parts.

Here, the main pattern part may have a diamond shape. However, the embodiment of the present invention is not limited thereto. The main pattern part may have various shapes different from that of the connection pattern part.

The first pattern 101A may have an opening in which the second pattern 102A is disposed adjacent to the first pattern 101A. The opening may have a shape corresponding to an outer shape of the first pattern 101A. The first pattern 101A may have a structure surrounding the second pattern 102A. The first pattern 101A is spaced a predetermined distance from the second pattern 102A.

The second pattern 102A has a shape extending along the first direction. The second pattern 102A is disposed adjacent to the first pattern 101A and spaced a predetermined distance from the first pattern 101A. The second pattern 102A may also be referred to as STX (Stylus TX).

The second pattern 102A is disposed adjacent to first pattern 101A.

The second pattern 102A may include a plurality of main pattern parts and a connection pattern part that connects two main pattern parts adjacent to each other among the plurality of main pattern parts. Here, the main pattern part may have a diamond shape. However, the embodiment of the present invention is not limited thereto. The main pattern part may have various shapes different from that of the connection pattern part.

The main pattern part of the second pattern 102A may have a shape corresponding to that of the main pattern part of the first pattern 101A. The connection pattern part of the second pattern 102A may have a shape corresponding to that of the connection pattern part of the first pattern 101A.

The third pattern 103A is disposed on each of left and right sides based on one connection pattern part of the first pattern 101A. The third pattern 103A may have a diamond shape. However, the embodiment of the present invention is not limited thereto. The third pattern 103A may have various shapes different from that of the connection pattern part.

The third pattern 103A may have an opening in which the fourth pattern 104A is disposed adjacent to the third pattern 103A. The opening may have a shape corresponding to an outer shape of the third pattern 103A. The third pattern 103A may have a structure surrounding the fourth pattern 104A. The third pattern 103A is spaced a predetermined distance from the fourth pattern 104A. The third pattern 103A may also be referred to as RX. The fourth pattern 104A may also be referred to as SRX (Stylus RX).

The third patterns extending along the second direction (width direction) perpendicular to the first direction among the plurality of third patterns 103A are electrically connected by a third conductive pattern D3.

The third conductive pattern D3 crosses the connection pattern part of the first pattern 101A, which is disposed between two adjacent third patterns.

The fourth patterns extending along the second direction perpendicular to the first direction among the plurality of fourth patterns 104A are electrically connected by a fourth conductive pattern D4.

The fourth conductive pattern D4 crosses the connection pattern part of the first pattern 101A disposed between two adjacent fourth patterns. Additionally, the fourth conductive pattern D4 electrically connects the fourth patterns 104A extending along the first direction.

The plurality of first to fourth patterns 101A, 102A, 103A, and 104A are arranged together on the same first layer but spaced apart from each other.

Meanwhile, an 'uplink signal' refers to a driving signal for driving the stylus pen. When sizes of signals received by the stylus pen by applying the same stylus pen driving signal to each of the plurality of first patterns 101 and the plurality of second patterns 102 are compared, the uplink signal is relatively greater when the stylus pen driving signal is applied to the plurality of second patterns 102 than when the stylus pen driving signal is applied to the plurality of first patterns 101.

Because the other ends of the plurality of second patterns 102 are electrically connected, at least one current loop may be formed by appropriately selecting two or more second patterns which are applied to the stylus pen driving signal. However, since the other ends of the plurality of first patterns 101 are not electrically connected, a current loop may not be formed.

When a current flows through respective first patterns 101, the current may not flow smoothly from one end of the first pattern 101 to the other end of the first pattern 101 because RC of the first pattern 101 is charged.

In addition, the stylus pen driving signal applied to the plurality of first patterns 101 is transmitted to the plurality of second patterns 101 in which the current loop is formed through capacitive coupling. This is because a signal attenuation occurs by the capacitive coupling.

Likewise, the uplink signal is relatively greater when the stylus pen driving signal is applied to the plurality of fourth patterns 104 than when the stylus pen driving signal is applied to the plurality of third patterns 103.

Meanwhile, a 'downlink signal' refers to a stylus pen signal received from the stylus pen.

When sizes of the signals are compared by receiving the same stylus pen signal from each of the plurality of first patterns 101 and the plurality of second patterns 102, the downlink signal is relatively greater when the stylus pen signal received through the plurality of second patterns 102 than when the stylus pen signal is received through the plurality of first patterns 101.

The reason is that while the other ends of the plurality of second patterns 102 are electrically connected to form a current loop, the other ends of the plurality of first patterns 101 are not electrically connected. In particular, the stylus pen signal is transmitted from the plurality of second patterns 102 in which the current loop is formed to the plurality of first patterns 101 through the capacitive coupling. Here, attenuation of the downlink signal occurs.

Likewise, the downlink signal is relatively greater when the stylus pen signal is received through the plurality of fourth patterns 104 than when the stylus pen signal is received through the plurality of third patterns 103.

Figure 6:
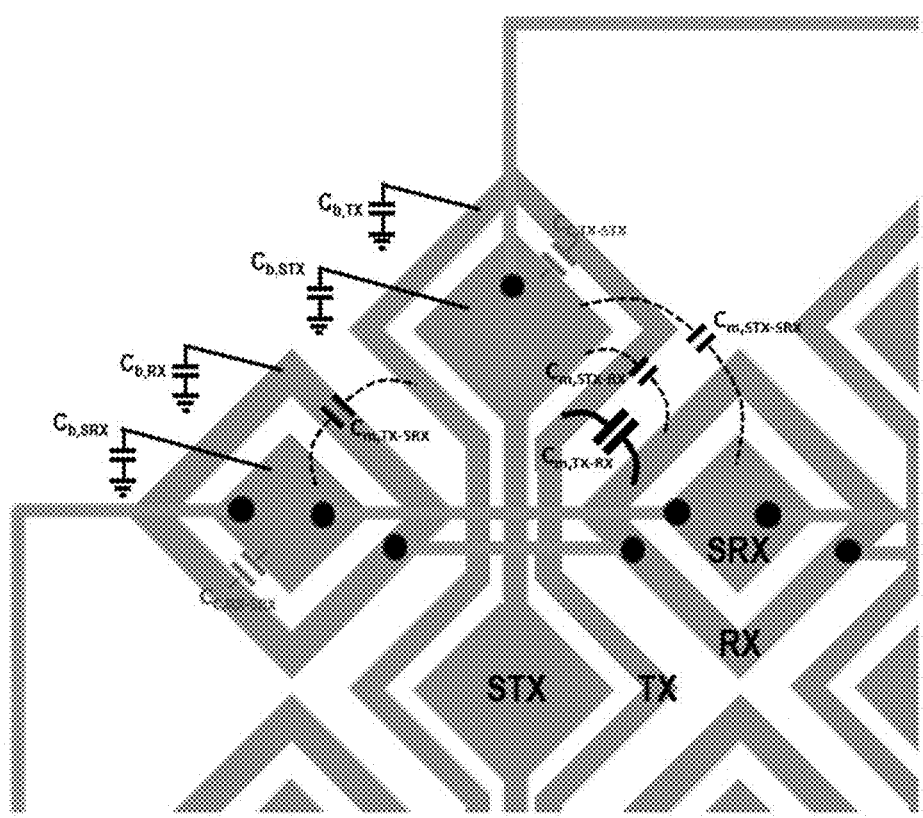
FIG. 6 is a plan view of the portion of the touch input sensor pattern to show capacitance occurring between the touch input sensor patterns shown in FIG. 5.

FIG. 6 is a plan diagram of a portion of the touch input sensor pattern to show capacitance occurring between the touch input sensor patterns shown in FIG. 5. Here, Cm means mutual capacitance, Cb means capacitance between each electrode and the ground, and Cc means coupling capacitance.

Figure 7:
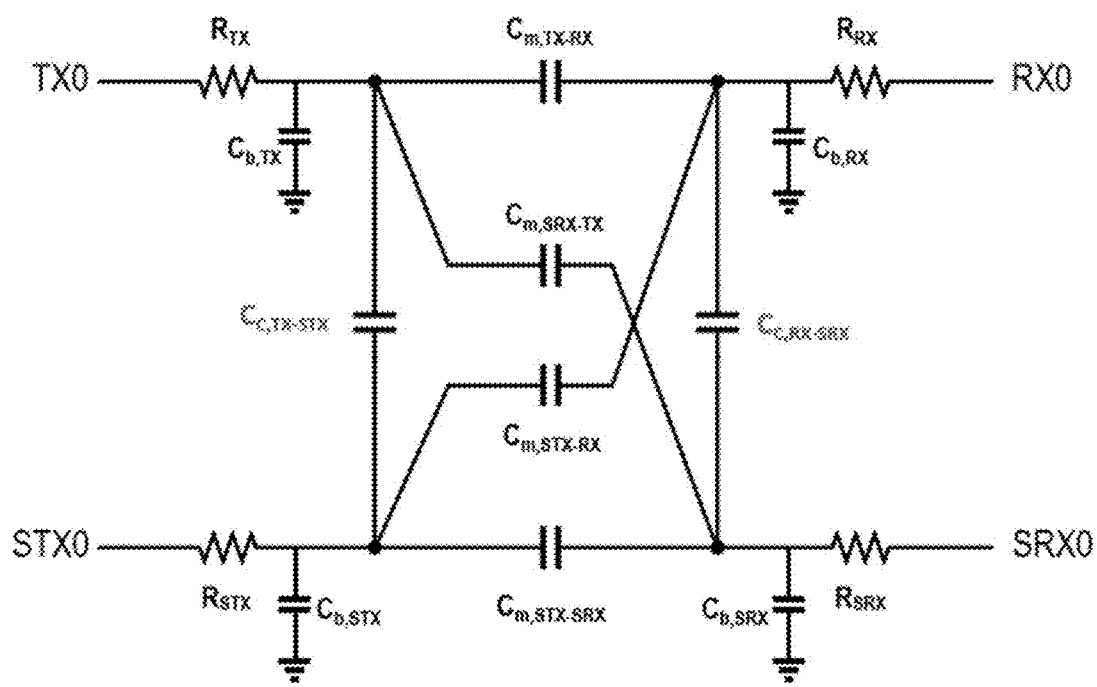
FIG. 7 is an equivalent circuit diagram of a portion of the touch input sensor pattern shown in FIG. 6.

FIG. 7 is an equivalent circuit diagram of a portion of the touch input sensor pattern shown in FIG. 6.

For example, in FIGS. 6 and 7, $C_{m,TX\text{-}RX}$ indicates mutual capacitance between the first touch electrode (TX) and the second touch electrode (RX). $C_{b,TX}$ indicates capacitance between the first touch electrode (TX) and the ground. $C_{C,TX\text{-}STX}$ indicates coupling capacitance between the first touch electrode (TX) and the first pen electrode (STX).

However, in the touch input sensor pattern shown in FIG. 6, when a touch operation signal is applied to a predetermined position during a finger mutual touch operation, following problems occur.

Figure 8:
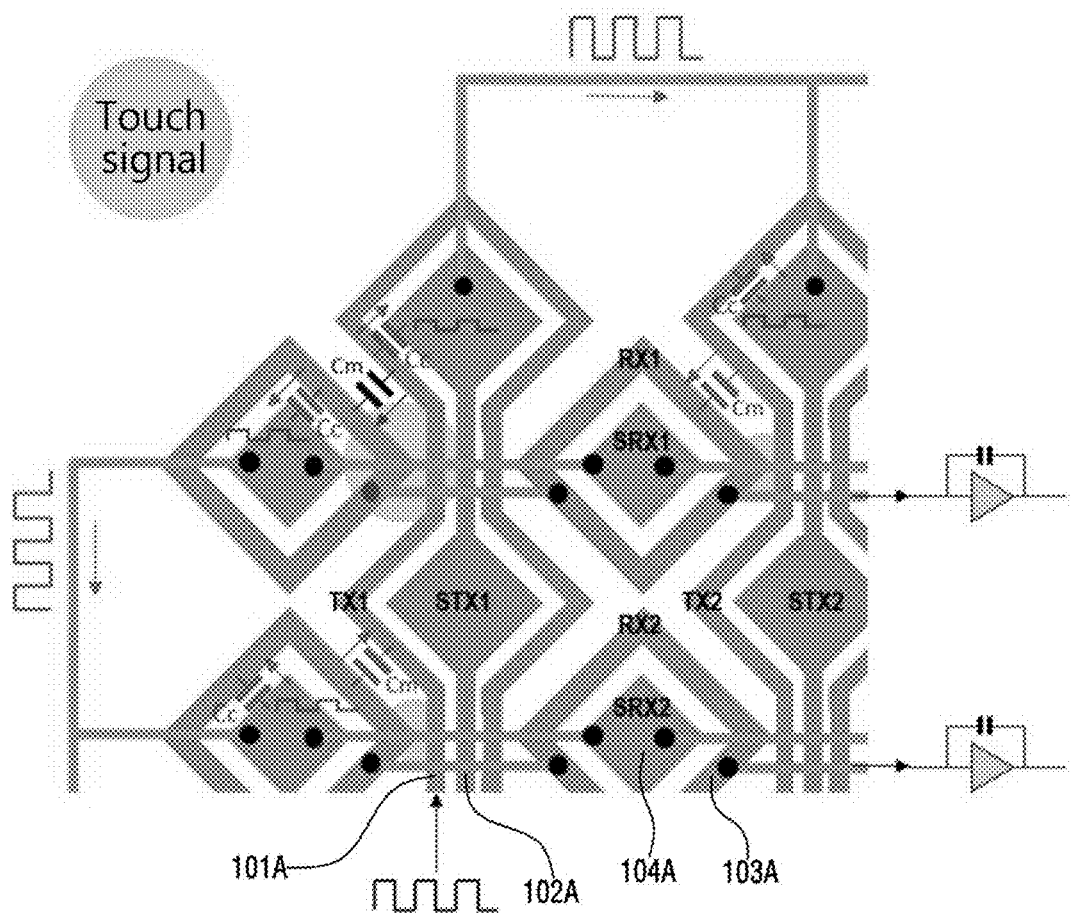
FIG. 8 is a plan view of a portion of the touch input sensor pattern to show a case in which a touch reception signal is detected in an area that is not touched among the touch input sensor patterns shown in FIG. 6.

FIG. 8 is a plan diagram of a portion of the touch input sensor pattern shown in FIG. 6 to explain a case where a touch reception signal is detected in a non-touched area.

As shown in FIG. 8, when a finger touch occurs between a first-1 touch electrode TX1 and a second-1 touch electrode RX1, a normal touch signal generally occurs between the first-1 touch electrode TX1 and the second-1 touch electrode RX1.

However, because of the capacitance coupling phenomenon, a touch driving coupling and/or a touch receiving coupling mainly occurs between the first touch electrode TX and the first pen electrode STX, and between the second touch electrode RX and the second pen electrode SRX. Therefore, an abnormally weak touch signal may occur between the first touch electrode TX and the second touch electrode RX.

First, a path in which the touch driving coupling occurs is as follows.

When the first-1 touch electrode TX1 is driven, a driving signal is coupled between the 1-1 touch electrode TX1 and the 1-1 pen electrode STX1 by a capacitance coupling phenomenon.

Here, as shown in FIG. 4, all first pen electrodes STX are electrically connected. Therefore, the driving signal coupling occurs between the first-2 touch electrode TX2 and the first-2 pen electrode STX2 by the driving signal coupling between the first-1 touch electrode TX1 and the first-1 pen electrode STX1.

Accordingly, a coupling with mutual capacitance Cm occurs between the first-2 touch electrode TX2 and the adjacent second-1 touch electrode RX1. Eventually, an abnormally weak touch signal is generated between the first-2 touch electrode TX2 and the second-1 touch electrode RX1.

Next, a path in which the touch receiving coupling occurs is as follows.

When the first-1 touch electrode TX1 is driven, a driving signal coupling with the mutual capacitance Cm occurs between the first-1 touch electrode TX1 and the second-1 touch electrode RX1.

Additionally, a driving signal coupling with coupling capacitance Cc occurs between the second-1 touch electrode RX1 and the second-1 pen electrode SRX1.

However, as shown in FIG. 4, the second pen electrode SRX is divided into upper and lower portions that are electrically connected to each other. Therefore, an abnormal step occurs because the coupling amount is different.

Therefore, due to the driving signal coupling generated from the second-1 pen electrode SRX1, a driving signal may be coupled not only between the second-2 pen electrodes SRX2 but also between the second-2 touch electrodes RX2 by the capacitance coupling phenomenon.

Accordingly, the coupling occurs between the second-2 touch electrode RX2 and the first-1 touch electrode TX1 with the mutual capacitance Cm. The abnormally weak touch signal is generated between the second-2 touch electrode RX2 and the first-1 touch electrode TX1. Ultimately, the abnormal step occurs.

As a result of an actual experiment, in the touch input sensor pattern shown in FIG. 6, it may be known that the touch signal is detected in an area that is not substantially touched as with FIG. 8 that will be described later when a touch signal is received during a finger mutual touch operation as a single reception or as a differential reception.

FIG. 9 is a table showing, during the finger mutual touch operation, an amount of a change in capacitance of the detected touch signal when the touch signal is received as a single reception (see (a)) and when the touch signal is received as a differential reception (see (b)) in the touch input sensor pattern shown in FIG. 6.

Figure 10:
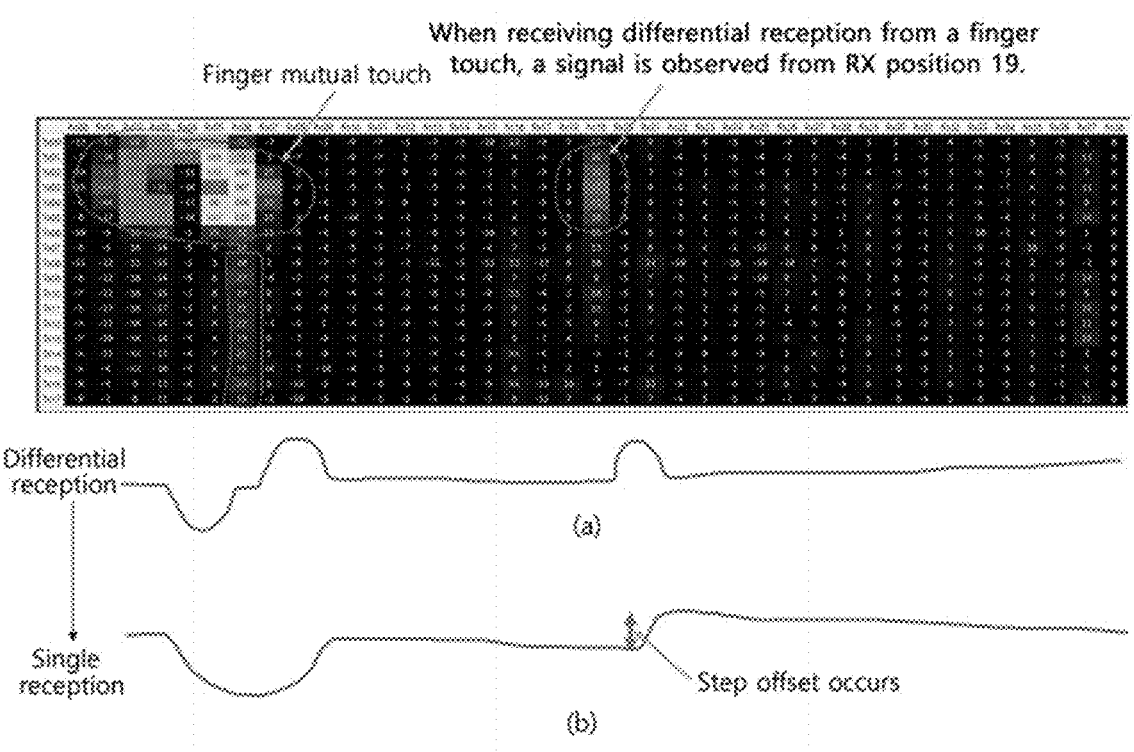
FIG. 10 is a graph showing a change in capacitance of the touch signal measured when the touch signal is received as a differential reception (see (a)) and when the touch signal is received as a single reception (see (b)) during the finger mutual touch operation in the touch input sensor pattern shown in FIG. 6.

FIG. 10 is a graph showing a change in capacitance of the touch signal measured when the touch signal is received as a differential reception (see (a)) and when the touch signal is received as a single reception (see (b)) during the finger mutual touch operation in the touch input sensor pattern shown in FIG. 6.

As shown in FIG. 9, when a single touch is received as a single reception (see (a)), it may be known that a big capacitance change of the touch signal occurs in an area (dotted circle) in which the touch driving coupling and the touch receiving coupling commonly occur.

Additionally, when the touch signal is received as a differential reception (see (b)), the amount of change in capacitance of the touch signal is also large in an area (dotted circle) that is not actually touched.

As shown in FIG. 10, it may be known that the change in capacitance of the touch signal changes from (−) to (+) when the finger mutual touch signal is received as the differential reception (see (a)), and an abnormal step occurs when the finger mutual touch signal is received as the single reception (see (b)).

According to the present invention, the finger mutual touch operation is as follows. The abnormally weak touch signal is prevented from occurring between the first touch electrode TX and the second touch electrode RX by grounding the first pen electrode STX and the second pen electrode SRX.

FIG. 11 is a table showing a control status of each electrode in the electronic device when a finger touch occurs in order to prevent occurrence of abnormal touch signals according to an embodiment of the present invention.

FIG. 12 is a table showing a control status of each electrode to be set within the electronic device in order to prevent the occurrence of an abnormal touch signal when the stylus pen touches according to an embodiment of the present invention.

Figure 13:
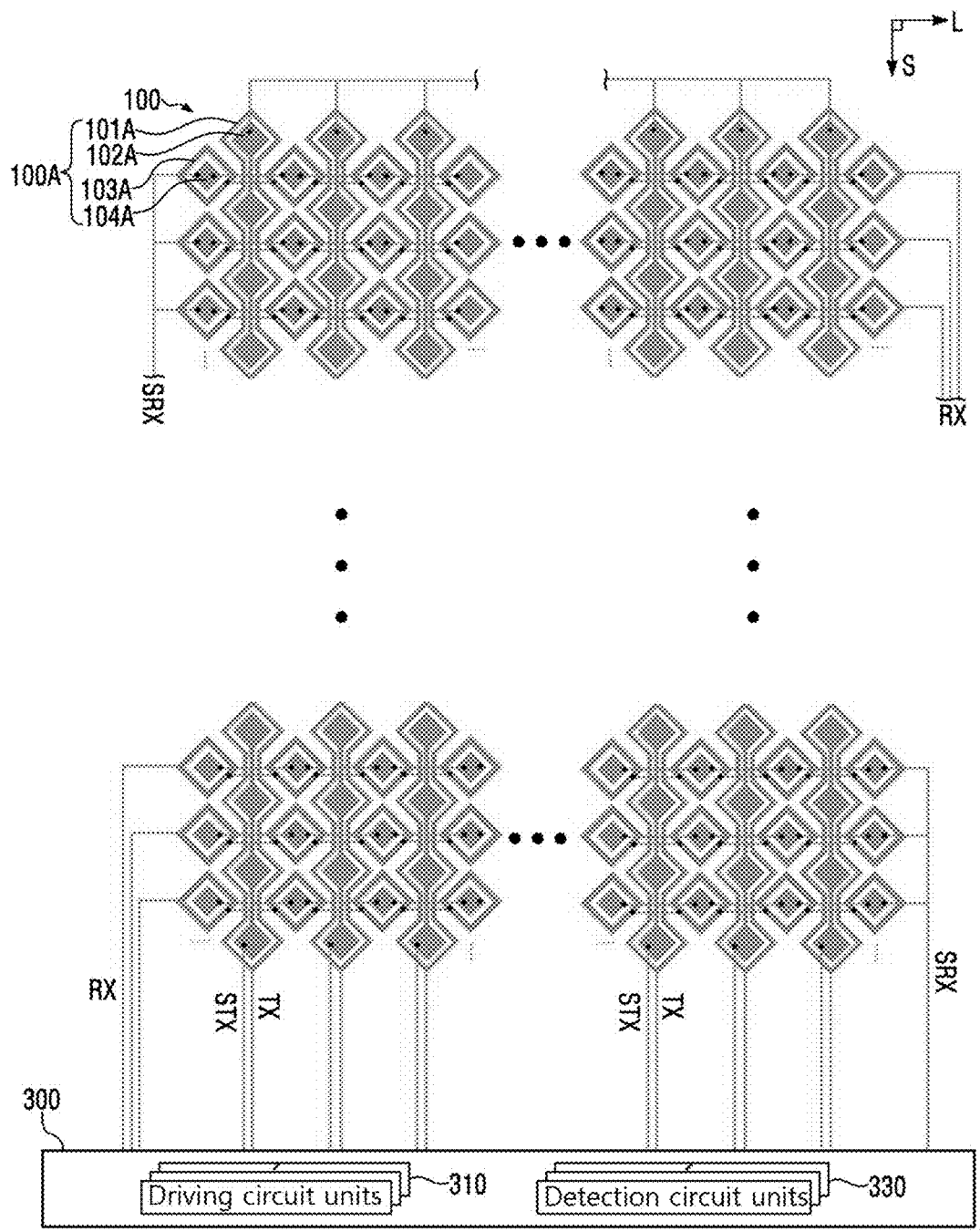
FIG. 13 is a configuration diagram of the entire electronic device according to an embodiment of the present invention.

FIG. 13 is a configuration diagram of the entire electronic device according to an embodiment of the present invention.

Figure 14:
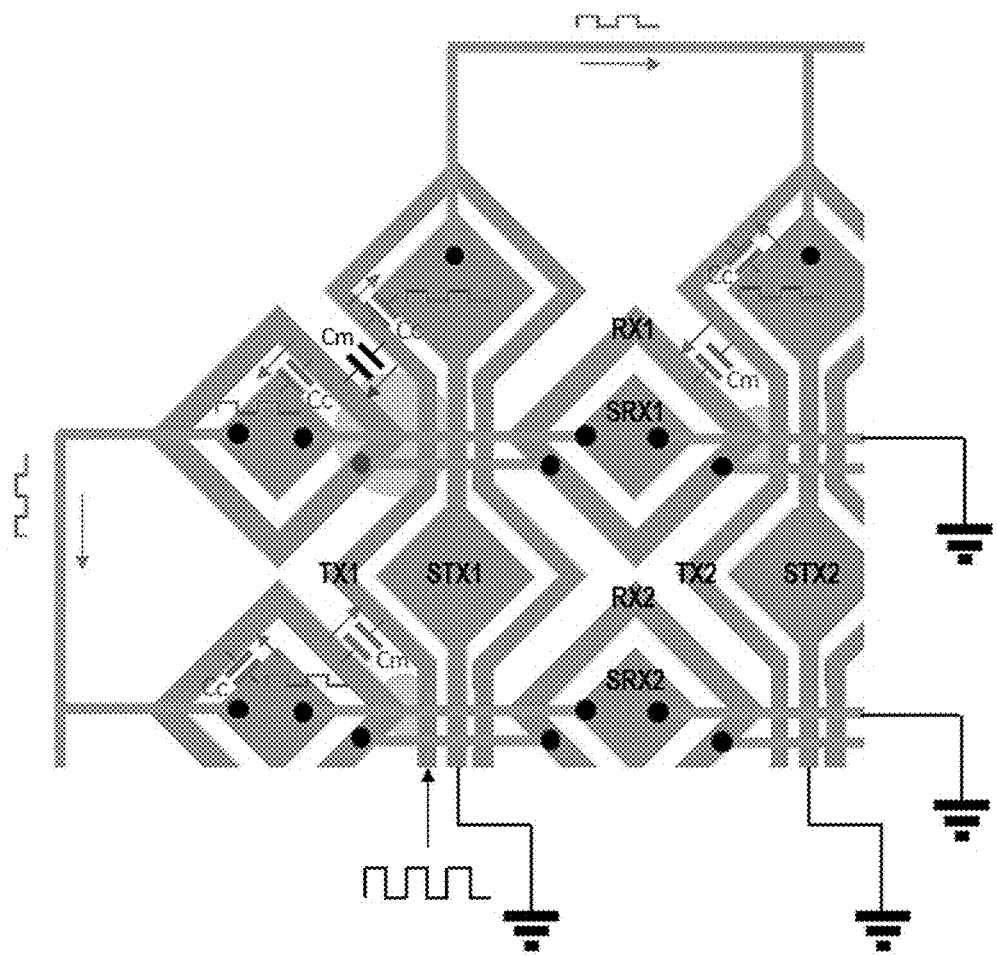
FIG. 14 is a plan diagram of a portion of the touch input sensor pattern in the electronic device shown in FIG. 13.

FIG. 14 is a plan diagram of a portion of the touch input sensor pattern in the electronic device shown in FIG. 13. Cm means mutual capacitance. Cc means coupling capacitance.

Figure 15:
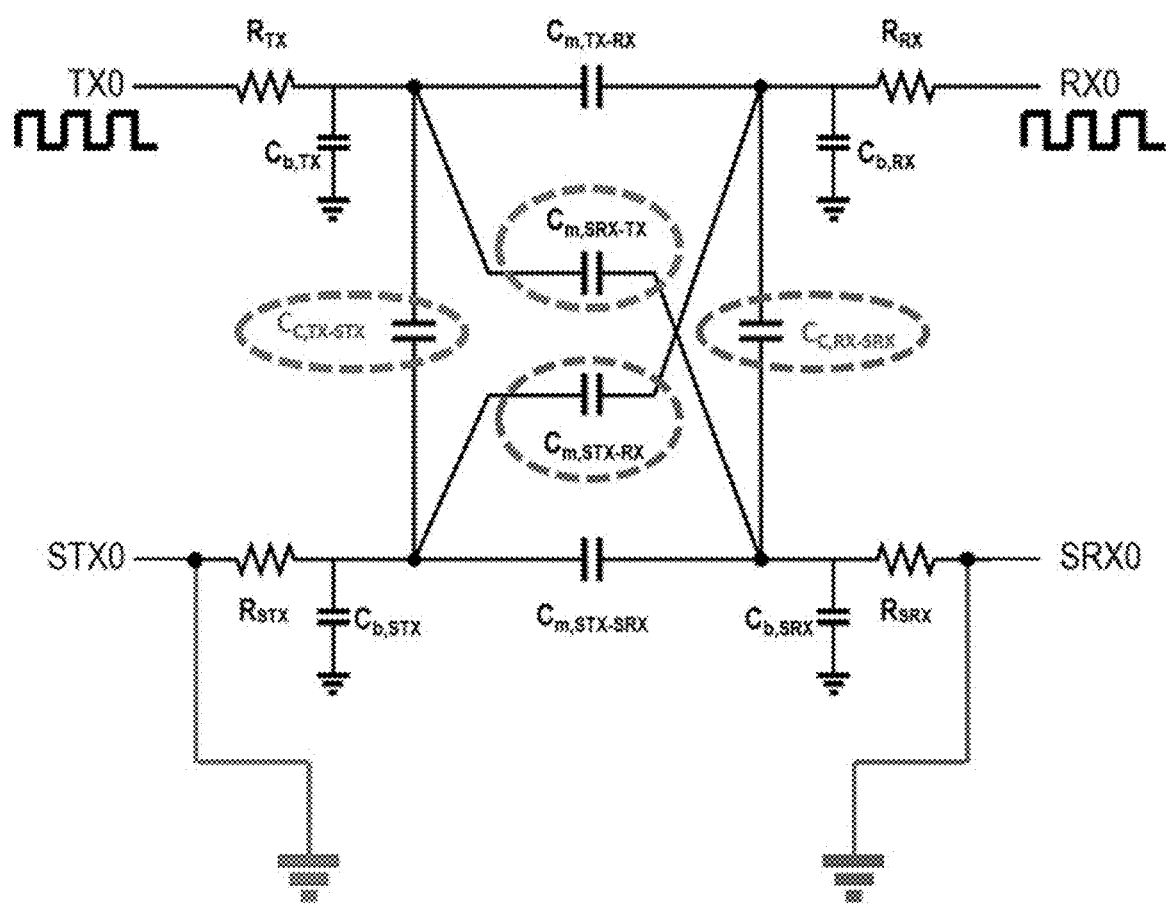
FIG. 15 is a circuit diagram for explaining a problem that occurs when the first pen electrode STX and the second pen electrode SRX are grounded in the self-sensing mode.

FIG. 15 is a circuit diagram for explaining a problem that occurs when the first pen electrode STX and the second pen electrode SRX are grounded in the self-sensing mode.

Figure 16:
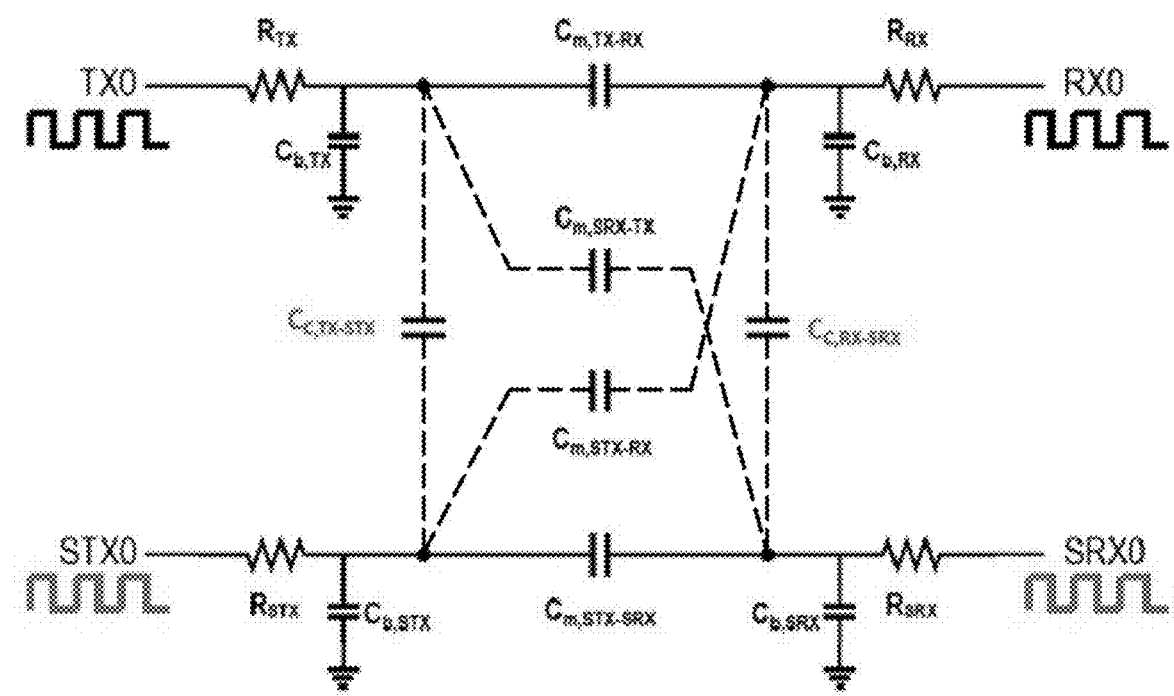
FIG. 16 is a circuit diagram for explaining a solution method of the present invention for the problem occurring in the circuit diagram shown in FIG. 15.

FIG. 16 is a circuit diagram for explaining a solution method of the present invention for the problem occurring in the circuit diagram shown in FIG. 15.

Figure 17:
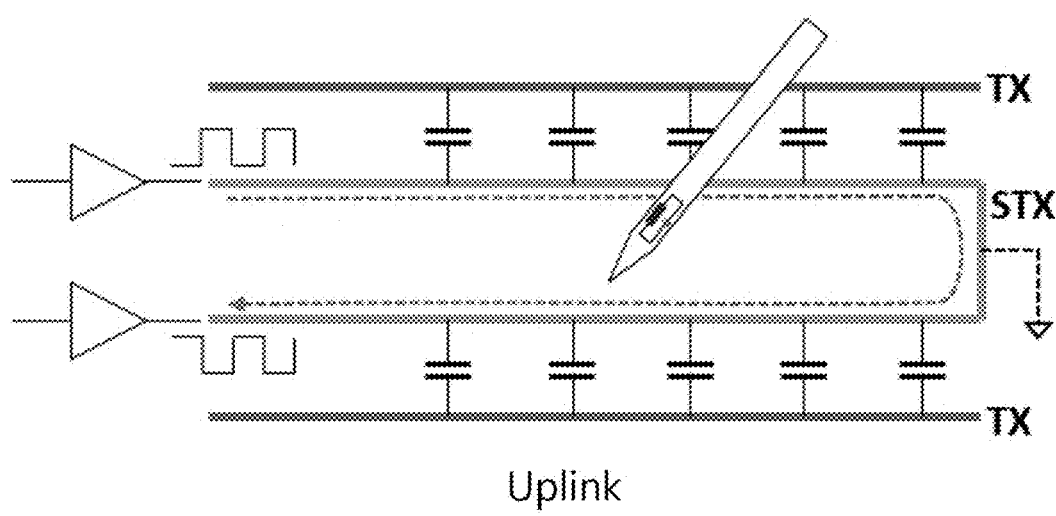
FIG. 17 is a schematic diagram for explaining an operation of each electrode in the uplink mode of the present invention in case of a stylus pen touch.

FIG. 17 is a schematic diagram for explaining an operation of each electrode in the uplink mode of the present invention in case of a stylus pen touch.

Figure 18:
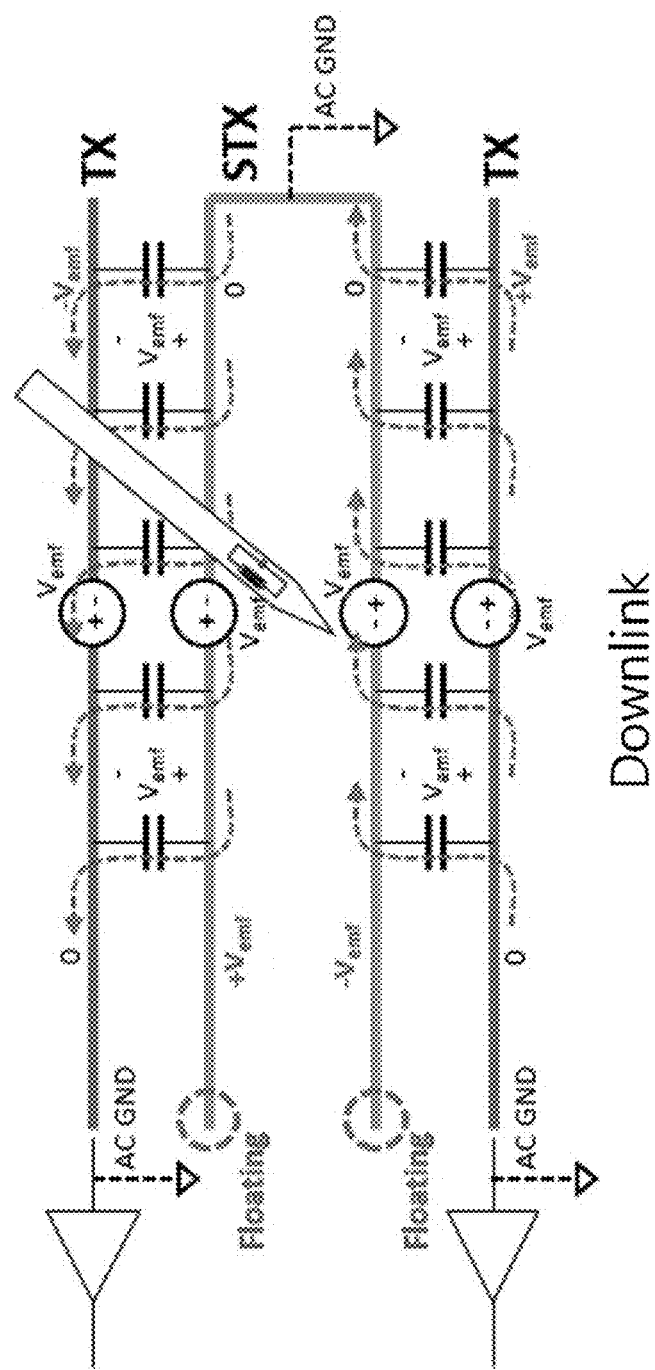
FIG. 18 is a schematic diagram for explaining the operation of each electrode in the downlink mode of the present invention in case of the stylus pen touch.

FIG. 18 is a schematic diagram for explaining the operation of each electrode in the downlink mode of the present invention in case of the stylus pen touch.

As shown in FIG. 13, the electronic device 100 of the present invention may include a sensor unit 100A and a control unit 300.

The sensor unit 100A includes a plurality of first to fourth patterns 101A, 102A, 103A, and 104A.

The first pattern 101A has a shape extending along a first direction (longitudinal direction). The first direction may be a direction L of a major axis of the screen of the electronic device 100. The first pattern 101A may also be referred to as TX (touch driving electrode).

The first pattern 101A may include a plurality of main pattern parts and a connection pattern part which connects two adjacent main pattern parts among the plurality of main pattern parts. Here, each of the main pattern parts may have a diamond shape. However, the embodiment of the present invention is not limited thereto. The main pattern part may have various shapes different from that of the connection pattern part.

The first pattern 101A may have an opening in which the second pattern 102A is disposed adjacent to the first pattern 101A. The opening may have a shape corresponding to that of the first pattern 101A. The first pattern 101A may have a structure surrounding the second pattern 102A. The first pattern 101A is spaced a predetermined distance from the second pattern 102A.

The second pattern 102A has a shape extending along the first direction. The second pattern 102A is adjacent to the first pattern 101A and spaced a predetermined distance from the first pattern 101A. The second pattern 102A may also be referred to as STX (Stylus TX, first pen electrode).

The second pattern 102A is disposed adjacent to the first pattern 101A.

The second pattern 102A may include a plurality of main pattern parts and a connection pattern part connects two adjacent main pattern parts among the plurality of main pattern parts. Here, the main pattern part may have a diamond shape. However, the embodiment of the present invention is not limited thereto. The main pattern part may have various shapes different from that of the connection pattern part.

The main pattern part of the second pattern 102A may have a shape corresponding to that of the main pattern part of the first pattern 101A. The connection pattern part of the second pattern 102A may have a shape corresponding to that of the connection pattern part of the first pattern 101A.

The third pattern 103A has a shape extending along a second direction (width direction) different from the first direction. The second direction may be perpendicular to the first direction and a direction S of a minor axis of the screen of the electronic device.

The third pattern 103A may also be referred to as RX (touch receiving electrode). The third pattern 103A may include a plurality of main pattern parts and a connection pattern part connecting two adjacent main pattern parts among the plurality of main pattern parts. Here, the main pattern part may have a diamond shape. However, the embodiment of the present invention is not limited thereto. The main pattern part may have various shapes different from that of the connection pattern part.

The third pattern 103A may have an opening in which the fourth pattern 104A is disposed adjacent to the third pattern 103A. The opening may have a shape corresponding to the shape of the third pattern 103A. The third pattern 103A may have a structure surrounding the fourth pattern 104A. The third pattern 103A is spaced a predetermined from the fourth pattern 104A.

The fourth pattern 104A has a shape extending along the second direction. The fourth pattern 104A is adjacent to the third pattern 103A and spaced a predetermined distance from the third pattern 103A. The fourth pattern 104A may also be referred to as SRX (Stylus RX, second pen electrode).

The fourth pattern 104A is disposed adjacent to the third pattern 103A.

The fourth pattern 104A may include a plurality of main pattern parts and a connection pattern part connecting two adjacent main pattern parts among the plurality of main pattern parts. Here, the main pattern part may have a diamond shape. However, the embodiment of the present invention is not limited thereto. The main pattern part may have various shapes different from that of the connection pattern part.

The main pattern part of the fourth pattern 104A may have a shape corresponding to that of the main pattern part of the third pattern 103A. The connection pattern part of the fourth pattern 104A may have a shape corresponding to that of the connection pattern part of the third pattern 103A.

The third and fourth patterns 103A and 104A are spaced a predetermined distance from the first and second patterns (101A, 102A) on the same layer.

Meanwhile, the control unit 300 is electrically connected to the sensor unit 100A. The control unit 300 may control an operation of the sensor unit 100A. The control unit 300 and the sensor unit 100A may be electrically connected to each other by a plurality of conductive patterns.

Cases in which the control unit 300 is connected to the sensor unit 100A are as follows.

The connection between the control unit 300 and the sensor unit 100A may be set to one of following cases: (a) a case of being connected with the plurality of first patterns 101A, the plurality of second patterns 102A, and the plurality of third patterns 103A; (b) a case of being connected with all of the plurality of first patterns 101A to the plurality of fourth patterns 104A; (c) a case of being connected with the plurality of first patterns 101A, the plurality of third patterns 103A, and the plurality of fourth patterns 104A; (d) a case of being connected with the plurality of first patterns 101A and the plurality of third patterns 103A; (e) a case of being connected with the plurality of first patterns 101A, the plurality of second patterns 102A, and the plurality of fourth patterns 104A; (f) a case of being connected with the plurality of second patterns 102A, the plurality of third patterns 103A, and the plurality of fourth patterns 104A; and (g) a case of being connected with the plurality of second patterns 102A and the plurality of fourth patterns 104A.

The control unit 300 may include a plurality of driving circuit units 310 and a plurality of detection circuit units 330.

The plurality of driving circuit units 310 may include a touch driving circuit unit which provides a touch driving signal to the plurality of first patterns 101A in order to sense a touch position of an object such as a finger. The plurality of driving circuit units 310 may include a pen driving circuit to provide a pen driving signal to the plurality of second patterns 102A in order to drive the stylus pen.

The plurality of detection circuit units 330 may include a touch detection circuit unit for detecting the touch position of the object such as the finger by receiving detection signals from the plurality of third patterns 103A. The plurality of detection circuit units 330 may include a pen detection circuit unit to sense the stylus pen through the plurality of second patterns 102A and the plurality of fourth patterns 104A. Here, some of the sensing circuits among the plurality of sensing circuits may sense the touch position as well as the stylus pen together.

As shown in FIG. 11, the control unit 300 may control the sensor unit 100A to operate in one of the mutual sensing mode or the self-sensing mode when the control unit 300 detects a finger using the sensor unit 100A.

Also, as shown in FIG. 12, the control unit 300 may control the stylus pen to operate in uplink mode when the stylus pen is driven using the sensor unit 100A and control the stylus pen to operate in uplink mode when the control unit 300 detects a stylus pen using the sensor unit.

First, in case of the finger touch that detects a finger, the operation of the sensor unit 100A by the control unit 300 is as follows.

The mutual sensing mode means that the touch driving electrode receives a driving signal and a detection signal is output from the adjacent touch receiving electrode.

The self-sensing mode means that each electrode receives the driving signal and outputs the detection signal at the same time.

In the mutual sensing mode, the first touch electrode TX that is the plurality of first patterns 101A performs a driving operation to which a touch driving signal is applied. The second touch electrode RX that is the plurality of third patterns 103A performs a receiving operation that outputs a touch detection signal. The first pen electrode STX, which is the plurality of second patterns 102A, may receive the touch driving signal (Driving), may be electrically grounded (GND), or may be electrically floating. The second pen electrodes SRX, which are the plurality of fourth patterns 104A, may output the touch detection signal (Receiving), be electrically grounded (GND), or electrically floating.

In particular, when the first pen electrode (STX) and the second pen electrode (SRX) are grounded (GND), as described above in FIG. 14, the other first pen electrode (STX) and/or the second pen electrode (SRX)) to minimize touch signals passing through. That is, it is possible to prevent or minimize the occurrence of the abnormally weak touch signal described in FIG. 14 in other first pen electrodes (STX) and/or second pen electrodes (SRX).

Here, even when the first pen electrode (STX) and the second pen electrode (SRX) are grounded (GND), the first pen electrode (STX) and the second pen electrode (SRX) may be electrically connected to the control unit 300 and receive a ground potential.

However, in the self-sensing mode that will be described later, when the first pen electrode STX and the second pen electrode SRX are grounded, a problem in which capacitance significantly increases may occur at the first touch electrode TX and the second touch electrode RX, which will be described later with reference to FIG. 15.

In the self-sensing mode, the first touch electrode TX and the second touch electrode RX may perform a touch driving operation and a touch receiving operation. The first pen electrode STX, which is the plurality of second patterns 102A, may receive the touch driving signal (Driving), may be electrically grounded (GND), or may be electrically floating. The second pen electrode SRX, which is the plurality of fourth patterns 104A, may receive the touch driving signal (Driving), may be electrically grounded (GND), or may be electrically floating.

Next, in case of a stylus pen touch that drives and senses the stylus pen, the operation of the sensor unit 100A is as follows.

The uplink mode means a mode of driving the stylus pen.

The downlink mode means a mode of receiving a stylus pen signal from the stylus pen.

As shown in FIG. 12, in the uplink mode, only the first pen electrode STX performs a driving operation to which a pen driving signal is applied. The first touch electrode TX may be electrically floating or may receive the pen driving signal. Also, the second touch electrode RX and the second pen electrode SRX may be electrically floating or grounded (GND). In the uplink mode, it is preferable that the remaining electrodes except the first pen electrode (STX) to which the pen driving signal is applied are electrically floating as shown in FIG. 17 to prevent various capacitances from being generated.

As shown in FIG. 12, in the downlink mode, when the first touch electrode (TX) and the second touch electrode (RX) perform a receiving operation to output a pen detection signal, the first pen electrode (STX) and the second pen electrode (SRX) may be electrically grounded (GND), output the pen detection signal (receiving), or electrically floating (floating).

Meanwhile, when the first pen electrode STX and the second pen electrode SRX perform a receiving operation (Receiving) to output a pen detection signal, the first touch electrode (TX) and the second touch electrode (RX) may be electrically grounded (GND), output the pen detection signal (Receiving), or electrically floating.

Here, in the downlink mode, when both the first pen electrode (STX) and the second pen electrode (SRX) are grounded (GND), current due to the pen signal may not flow. Accordingly, it is desirable to electrically floating both the first pen electrode (STX) and the second pen electrode (SRX).

When both the first pen electrode (STX) and the second pen electrode (SRX) are electrically floating, the corresponding electrodes (STX, SRX) are not electrically connected to the control unit 300 and thus no potential is applied.

Hereinafter, in the self-sensing mode, a problem occurring when the first pen electrode STX and the second pen electrode SRX are grounded and a solution on the problem of the present invention will be described in detail.

As shown in FIG. 15, when a first pen electrode STX0 and a second pen electrode SRX0 are grounded in self-sensing mode, capacitance of a touch driving electrode TX0 may become very large because capacitance $C_{b,TX}$ between a first touch electrode TX and a ground, coupling capacitance $C_{c, Tx\text{-}STX}$ between the first touch electrode TX and a first pen electrode STX, and mutual capacitance Cm, SRX-TX between a second pen electrode SRX and the first touch electrode TX are added thereto.

In addition, capacitance of a touch receiving electrode RX0 may become very large because capacitance $C_{b, RX}$ between a second touch electrode RX and a ground, coupling capacitance $C_{c, Rx\text{-}SRX}$ between the second touch electrode RX and the second pen electrode SRX, and mutual capacitance Cm, STX-RX between the first pen electrode STX and the second touch electrode RX are added thereto.

To solve these problems in the present invention, as shown in FIG. 16, during self-sensing mode operation, when the touch driving electrode TX0 and the touch receiving electrode RX0 are operated, the first pen electrode STX0 and the second pen electrode SRX0 are also operated. That is, the touch driving signal applied to the touch driving electrode TX0 and the touch receiving electrode RX0 is simultaneously applied to the first pen electrode STX0 and the second pen electrode SRX0.

In this case, the coupling capacitance Cc, Tx-STX, the mutual capacitance Cm, SRX-TX, the coupling capacitance Cc, RX-SRX, and the mutual capacitance Cm, STX-RX do not occur. Therefore, it is possible to prevent large capacitance added to the ground capacitance Cb, TX and/or the ground capacitance Cb, RX.

Meanwhile, as shown in FIG. 13, the control unit 300 may control the plurality of driving circuit units 310 and the detection circuit unit 330 by electrically connecting the sensor unit 100A thereto according to each mode. For this purpose, the control unit 300 may include a plurality of switches (not shown) which electrically connect the plurality of driving circuit units 310, the detection circuit units 330, and the sensor units 100A based on a command of the control unit 300.

In this way, the present invention prevents the abnormally weak touch signal from occurring in the area which is not actually touched during the finger mutual touch operation. The present invention provides the electronic device which is capable of preventing a significant increase of the capacitance at the touch driving electrode as well as the touch receiving electrode.

Through this, the present invention may proactively prevent the abnormally weak touch signal in the area which is not actually touched when the touch signal is detected during the finger mutual touch operation.

Additionally, in the mutual sensing mode, the driving signal is applied to the driving electrode, and the detection signal is output from the receiving electrode. The abnormal transmission of the touch signal to the pen driving electrode and/or the pen receiving electrode by grounding the plurality of pen driving electrodes and the plurality of pen receiving electrodes.

Additionally, in the self-sensing mode, the input of the driving signal and the output of the detection signal are performed simultaneously at one electrode. When the pen driving electrode and the pen receiving electrode are grounded, not only the touch driving electrode and the touch receiving electrode but also the pen driving electrode and the pen receiving electrode are driven. Therefore, a significant increase in parasitic capacitance between the touch driving electrode and the touch receiving electrode may be prevented.

The features, structures, effects, etc. described in the embodiments above are included in one embodiment of the present invention, but it is not necessarily limited to only one embodiment. Furthermore, the features, structures, effects, etc. illustrated in each embodiment can be combined and/or modified, and it can be implemented in other embodiments by an ordinary skilled person in the art where the embodiments belong. Therefore, contents related to such combinations and modifications should be construed as being included in the scope of the present invention.

In addition, the above description focuses on the embodiment as an example, therefore it should not limit the present invention. An ordinary skilled person in the art could understand the above without departing from the essential characteristics of the present embodiment, and the person could various modifications and applications which are not illustrated. For example, each component specifically shown in the embodiments can be modified and implemented. These variations and differences in application should be construed as being included within the scope of the present invention and being defined in the appended claims.

The present invention discloses an electronic device which includes a sensor unit, and a control unit. The sensor unit includes a plurality of first patterns extending in a first direction; and a plurality of second patterns extending in the first direction and are disposed adjacent to the first patterns, wherein the ends of the plurality of second patterns are electrically connected; a plurality of third patterns extending in a second direction perpendicular to the first direction; and a plurality of fourth patterns extending in the second direction and are disposed adjacent to the third pattern, wherein ends of the plurality of fourth patterns are electrically connected.

What is claimed is:

1. An electronic device comprising:
   a sensor unit; and
   a control unit,
   wherein the sensor unit comprises:
      a plurality of first patterns extending in a first direction;
      a plurality of second patterns extending in the first direction, wherein the plurality of second patterns is disposed adjacent to the plurality of first patterns and have one ends that are electrically connected to each other;
      a plurality of third patterns extending in a second direction perpendicular to the first direction; and
      a plurality of fourth patterns extending in the second direction, wherein the plurality of fourth patterns is disposed adjacent to the plurality of third patterns and have one ends that are electrically connected to each other,
   wherein, when the control unit controls the sensor unit in a self-sensing mode in which the control unit applies a touch driving signal to each of the plurality of first patterns and the plurality of third patterns and receives a touch detection signal from each of the plurality of first patterns and the plurality of third patterns, and
      wherein the control unit is configured to apply the touch driving signal to the plurality of second patterns and the plurality of fourth patterns in the self-sensing mode.

2. The electronic device of claim 1,
   wherein the control unit controls the sensor unit in a mutual sensing mode,
   wherein the mutual sensing mode is a mode in which the control unit applies a touch driving signal to the plurality of first patterns and receives a touch detection signal from the plurality of third patterns, and
   wherein in the mutual sensing mode, the control unit is configured to:
      apply the touch driving signal to the plurality of second patterns, electrically ground the plurality of second patterns, or electrically float the plurality of second patterns; and
      receive the touch detection signal from the plurality of fourth patterns, electrically ground the plurality of fourth patterns, or electrically float the plurality of fourth patterns.

3. The electronic device of claim 2,
   wherein, in the mutual sensing mode, the control unit is configured to electrically ground the plurality of second patterns and the plurality of fourth patterns.

4. The electronic device of claim 1,
   wherein the control unit controls the sensor unit to operate in a downlink mode for sensing the touch position of the stylus pen,
   wherein, in the downlink mode, the control unit is configured to:
      receive a pen detection signal of the stylus pen from the plurality of first patterns and the plurality of third patterns; and
      receive the pen detection signal from the plurality of second patterns and the plurality of fourth patterns, or electrically ground or electrically float the plurality of second patterns and the plurality of fourth patterns.

5. The electronic device of claim 1,
   wherein the control unit controls the sensor unit to operate in a downlink mode for sensing the touch position of the stylus pen,
   wherein, in the downlink mode, the control unit is configured to:
      receive a pen detection signal of the stylus pen from the plurality of second patterns and the plurality of fourth patterns; and
      receive the pen detection signal from the plurality of first patterns and the plurality of third patterns, or electrically ground or electrically float the plurality of first patterns and the plurality of third patterns.

6. The electronic device of claim 1,
   wherein the plurality of first to fourth patterns are spaced apart from each other on the same layer.

7. The electronic device of claim 1,
   wherein the control unit is configured to set a connection with the plurality of first patterns to the plurality of fourth patterns in one of following cases comprising:
   (a) a case of being connected with the plurality of first patterns, the plurality of second patterns, and the plurality of third patterns;
   (b) a case of being connected with all of the plurality of first patterns to the plurality of fourth patterns;
   (c) a case of being connected with the plurality of first patterns, the plurality of third patterns, and the plurality of fourth patterns;
   (d) a case of being connected with the plurality of first patterns and the plurality of third patterns;
   (e) a case of being connected with the plurality of first patterns, the plurality of second patterns, and the plurality of fourth patterns;
   (f) a case of being connected with the plurality of second patterns, the plurality of third patterns, and the plurality of fourth patterns; and
   (g) a case of being connected with the plurality of second patterns and the plurality of fourth patterns.

8. An electronic device comprising:
   a sensor unit; and
   a control unit,
   wherein the sensor unit comprises:
      a plurality of first patterns extending in a first direction;
      a plurality of second patterns extending in the first direction, wherein the plurality of second patterns is disposed adjacent to the plurality of first patterns and have one ends that are electrically connected to each other;
      a plurality of third patterns extending in a second direction perpendicular to the first direction; and
      a plurality of fourth patterns extending in the second direction, wherein the plurality of fourth patterns is disposed adjacent to the plurality of third patterns and have one ends that are electrically connected to each other,
   wherein the control unit controls the sensor unit to operate in an uplink mode for driving the stylus pen,
   wherein, in the uplink mode, the control unit is configured to:

apply a pen driving signal for driving the stylus pen using the plurality of second patterns;

apply the pen driving signal to the plurality of first patterns or to electrically float the plurality of first patterns; and electrically ground or electrically float the plurality of third patterns and the plurality of fourth patterns.

9. The electronic device of claim 8, wherein the control unit controls the sensor unit in a mutual sensing mode, wherein the mutual sensing mode is a mode in which the control unit applies a touch driving signal to the plurality of first patterns and receives a touch detection signal from the plurality of third patterns, and wherein in the mutual sensing mode, the control unit is configured to:

apply the touch driving signal to the plurality of second patterns, electrically ground the plurality of second patterns, or electrically float the plurality of second patterns; and receive the touch detection signal from the plurality of fourth patterns, electrically ground the plurality of fourth patterns, or electrically float the plurality of fourth patterns.

10. The electronic device of claim 9, wherein, in the mutual sensing mode, the control unit is configured to electrically ground the plurality of second patterns and the plurality of fourth patterns.

11. The electronic device of claim 8, wherein the control unit controls the sensor unit to operate in a downlink mode for sensing the touch position of the stylus pen, wherein, in the downlink mode, the control unit is configured to:

receive a pen detection signal of the stylus pen from the plurality of first patterns and the plurality of third patterns; and receive the pen detection signal from the plurality of second patterns and the plurality of fourth patterns, or electrically ground or electrically float the plurality of second patterns and the plurality of fourth patterns.

12. The electronic device of claim 8, wherein the control unit controls the sensor unit to operate in a downlink mode for sensing the touch position of the stylus pen, wherein, in the downlink mode, the control unit is configured to:

receive a pen detection signal of the stylus pen from the plurality of second patterns and the plurality of fourth patterns; and receive the pen detection signal from the plurality of first patterns and the plurality of third patterns, or electrically ground or electrically float the plurality of first patterns and the plurality of third patterns.

13. The electronic device of claim 8, wherein the plurality of first to fourth patterns are spaced apart from each other on the same layer.

* * * * *